US012194736B2

(12) United States Patent
Escudero Gonzalez et al.

(10) Patent No.: US 12,194,736 B2
(45) Date of Patent: Jan. 14, 2025

(54) PRINTING SYSTEMS AND ASSOCIATED STRUCTURES AND METHODS HAVING INK DROP DEFLECTION COMPENSATION

(71) Applicant: Electronics for Imaging, Inc., Londonderry, NH (US)

(72) Inventors: Juan Escudero Gonzalez, Almazora (ES); Eduardo Bueno Espinal, Almazora (ES)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 10 days.

(21) Appl. No.: 18/342,633

(22) Filed: Jun. 27, 2023

(65) Prior Publication Data

US 2023/0339242 A1 Oct. 26, 2023

Related U.S. Application Data

(63) Continuation of application No. 17/169,055, filed on Feb. 5, 2021, now Pat. No. 11,752,784, which is a continuation of application No. 16/411,982, filed on May 14, 2019, now Pat. No. 10,913,294.

(51) Int. Cl.
*B41J 11/06* (2006.01)
*B41J 11/00* (2006.01)

(52) U.S. Cl.
CPC .............. *B41J 11/06* (2013.01); *B41J 11/007* (2013.01)

(58) Field of Classification Search
CPC ........ B41J 11/06; B41J 11/007; B41J 11/0085
USPC .......................................................... 347/104
See application file for complete search history.

(56) References Cited

U.S. PATENT DOCUMENTS

| | | | |
|---|---|---|---|
| 6,927,841 | B2 | 8/2005 | Hinojosa et al. |
| 9,815,303 | B1 | 11/2017 | Herrmann et al. |
| 2002/0110400 | A1 | 8/2002 | Beehler et al. |
| 2006/0043666 | A1 | 3/2006 | Piccinino |
| 2008/0218576 | A1 | 9/2008 | Phillips et al. |
| 2009/0262174 | A1 | 10/2009 | Toyoshima |
| 2010/0084803 | A1 | 4/2010 | Akihiro et al. |
| 2011/0064506 | A1 | 3/2011 | Spence et al. |
| 2011/0193909 | A1 | 8/2011 | Takamoto |
| 2015/0259144 | A1 | 9/2015 | Hershfeld |
| 2017/0210146 | A1 | 7/2017 | Besson et al. |

FOREIGN PATENT DOCUMENTS

| | | | |
|---|---|---|---|
| CN | 1090815 | A | 8/1994 |
| CN | 1434770 | A | 8/2003 |
| CN | 101636274 | A | 1/2010 |

(Continued)

*Primary Examiner* — Jason S Uhlenhake
*Assistant Examiner* — Alexander D Shenderov
(74) *Attorney, Agent, or Firm* — Perkins Coie LLP

(57) ABSTRACT

A printing system having a vacuum transfer belt conveyor includes a fixed or movable perforated platen that supports workpieces, e.g., substrates, boards or other parts, to be printed. The printing system is configured to apply vacuum action through apertures or perforations defined through the perforated platen. In an embodiment, the print system is configured to mitigate deflection of ink drops, through the implementation of both a passive system, which reduces air flow in the region below the a print bar that includes one or more printheads, as well as an active system, which distributes the workpieces, e.g., substrates or boards, with respect to perforations in the transfer belt. In some embodiments, the perforated platen is comprised of a plurality of modular plates.

20 Claims, 20 Drawing Sheets

(56) References Cited

FOREIGN PATENT DOCUMENTS

| | | | |
|---|---|---|---|
| CN | 101678676 | A | 3/2010 |
| EP | 3118008 | A1 | 1/2017 |
| ES | 2310490 | B1 | 11/2009 |
| WO | 9408792 | A1 | 4/1994 |
| WO | 0187618 | A1 | 11/2001 |
| WO | 2008115358 | A1 | 9/2008 |
| WO | 2008136945 | A1 | 11/2008 |

PRINTING SYSTEMS AND ASSOCIATED STRUCTURES AND METHODS HAVING INK DROP DEFLECTION COMPENSATION

CROSS-REFERENCE TO RELATED APPLICATION(S)

This application is a continuation of U.S. patent application Ser. No. 17/169,055, filed on Feb. 5, 2021, which is a continuation of U.S. patent application Ser. No. 16/411,982, filed on May 14, 2019, issued as U.S. Pat. No. 10,913,294, which are incorporated herein by reference in their entirety.

TECHNICAL FIELD

At least one embodiment of the present invention pertains to a vacuum conveyor system for inkjet printing applications. More specifically, at least one embodiment of the present invention pertains to vacuum conveyor printing systems, and associated structures and methods that mitigate ink drop deflection.

BACKGROUND

Vacuum conveyor systems in inkjet printing applications can be used for flattening, securing and conveying substrates, to ensure accurate reproduction of an image to be printed on the substrate. Such vacuum conveyor systems typically include a perforated transfer belt and a perforated support table, through which a vacuum can be applied to generate adhesion forces between the substrate and the transfer belt. One of the problems associated with this configuration is related to the presence of open perforations through the transfer belt and the support table near the periphery of the conveyed substrate. During the drop jetting process, the flow of air through these open perforations can induce a drag force on the falling ink drops, which can make the ink drops deviate from their designated landing location. This effect is called drop deflection.

Some vacuum conveyor systems have been disclosed to prevent the flow of applied vacuum through open perforations that are not covered by the substrates. For instance, some vacuum conveyor systems can be adjusted for the media size along the transverse direction, by separating the vacuum chamber into different compartments, which can be independently opened or closed, such as to eliminate the flow of applied vacuum on one or both sides of the substrate as the substrate is transferred through the printing area. Other vacuum conveyor systems can control the active width of a print chamber in a stepless manner.

Furthermore, some vacuum conveyor systems have been disclosed to address the transient nature of substrate passages, such as with respect to the space between two adjacent substrates as they are transported through the printing system. For instance, at least one vacuum conveyor system has been disclosed that synchronizes the timing of the feeding of the sheets with the position of belt holes, to ensure that there are no openings in the gap between adjacent substrates. However, this procedure only works if the gap between boards, plus the board length, is a multiple of the distance between belt holes along the process direction. As a result, this procedure limits the allowable perforation patterns, the substrate dimensions, and the gap between sheets. In an alternate system, solid inter-copy gaps are employed to prevent this effect, but is limited in terms of format size.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Introduced here are techniques that can be used to improve mitigate ink drop deflection in a printing environment that includes an applied vacuum to retain workpieces on a conveyor belt while the workpieces are transferred through a printing region.

One or more of the techniques discloses herein can be implemented for a wide variety of vacuum conveyor configurations, and do not limit the working conditions of the vacuum conveyor system.

Figure 1:
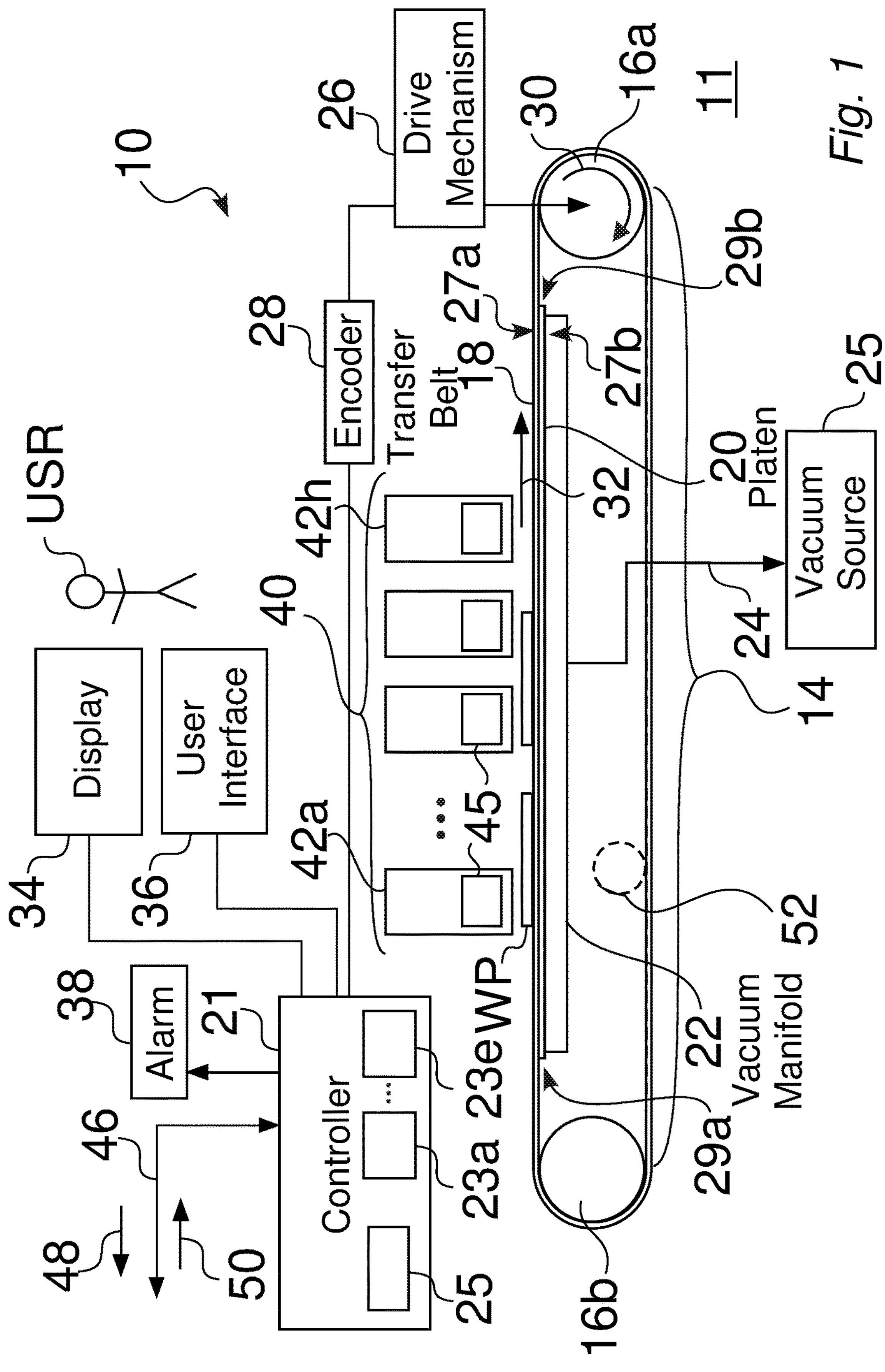
FIG. 1 is a simplified schematic diagram of an illustrative printing system having drop deflection compensation, including a conveyor system having a perforated platen, a plurality of printheads, a substrate delivery system, and a vacuum delivery system.
Figure 3:
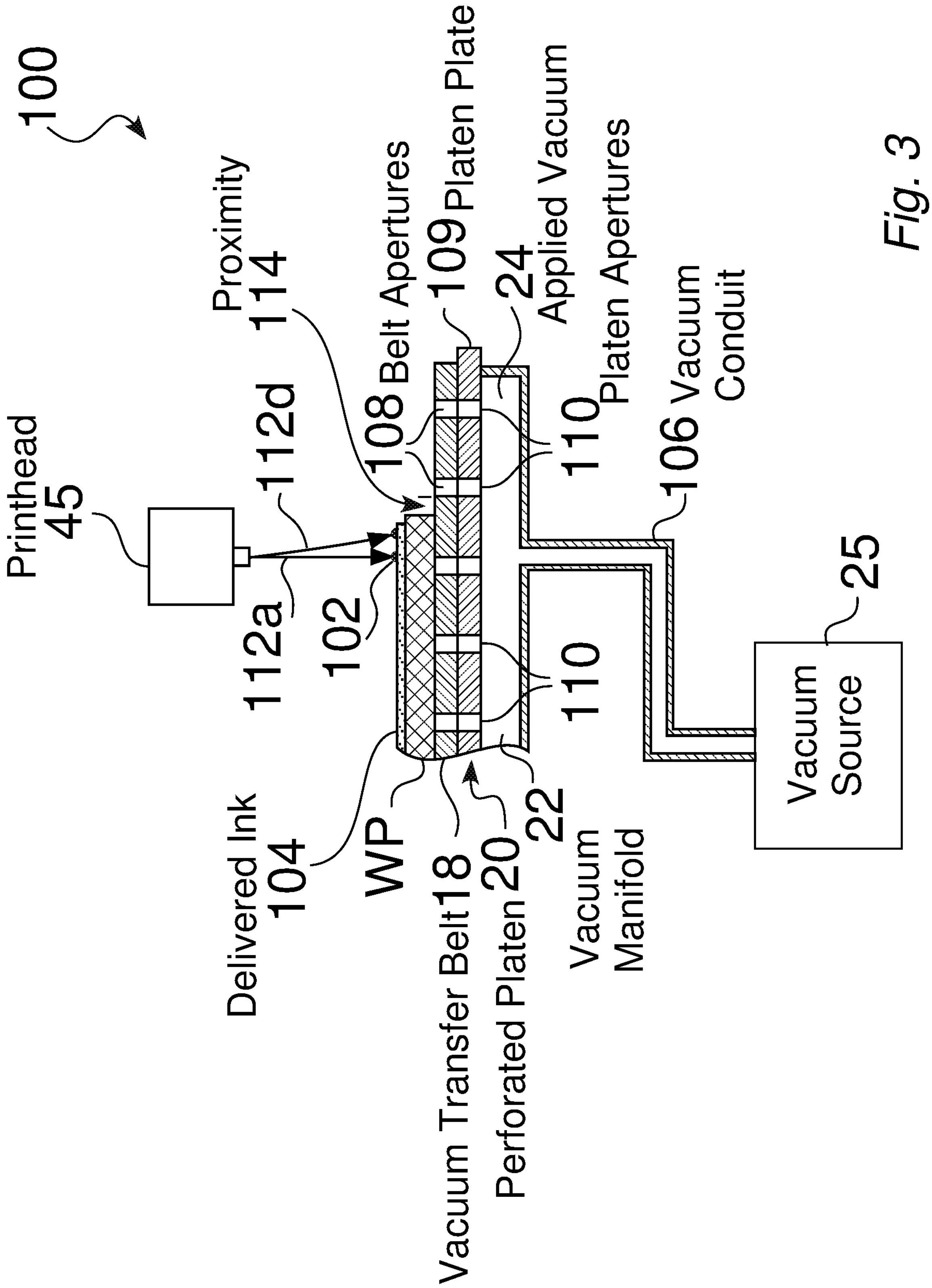
FIG. 3 is a partial cutaway view of an illustrative printing system having a perforated vacuum platen and a conveyor, in which applied vacuum near the periphery of a printing region can result in ink drop deflection.

FIG. 1 is a schematic diagram of an illustrative printing system 10 having a printer vacuum table conveyor system 11 for transporting one or more workpieces WP in relation to an array 40 of one or more print bars 42, e.g., 42*a*-42*h*, wherein each of the print bars 42 includes one or more printheads 45, and in which the system 10 can be configured to mitigate deflection 112*d* (FIG. 3) of ink drops 102 (FIG. 3).

FIG. 3 is a partial cutaway view 100 of an illustrative printing system 10 having a perforated platen 20 and conveyor, i.e., transfer belt 18, in which applied vacuum 24 near the periphery of a printing region can result in ink drop deflection 112*d*. As seen in FIG. 1 and FIG. 3, the perforated platen 20 includes a platen plate 109 having a first surface 27*a* and a second surface 27*b* opposite the first surface 27*a*, wherein the platen plate extends from a first end 29*a* to a second end 29*b* opposite the first end 29*a*.

The illustrative printing system 10 seen in FIG. 3 includes a vacuum source 25 that is connected though a vacuum conduit 106 to a vacuum manifold 22, in which a vacuum 24 can be applied to a workpiece WP, such as through platen apertures 110 and belt apertures 108. As seen in FIG. 3, a belt aperture 108 in close proximity 114 to a workpiece WP, but not covered by the workpiece WP, can result in deflection 112*d* of ink drops 102, which would otherwise be delivered 141 (FIG. 5) through an intended trajectory 112*a* to accurately define an image 104 on the workpiece WP.

In an illustrative embodiment, a perforated platen 20 for a printing system 10 can include: a platen plate 109 having a first surface 27*a* and a second surface 27*b* opposite the first surface 27*a*, wherein the platen plate 109 extends from a first end 29*a* to a second end 29*b* opposite the first end 29*a*, and a first transverse side 250*a* (FIG. 7) and a second transverse side 250*b* (FIG. 7) opposite the first side 250*a*; a plurality of apertures 110 that extend from the first surface 27*a* to the second surface 27*b* of the platen plate 109, wherein the plurality of apertures 110 are arranged in a plurality of rows 442 (FIG. 11) that extend longitudinally between the first end 29*a* and the second end 29*b*; wherein the first surface 27*a* of the platen plate 109 is configured for supporting a transfer belt 18 that includes a plurality of holes 108 therethrough, as the transfer belt 18 is advanced from the first end 29*a* of the platen plate 109, through a printing region 406 corresponding to one or more print bars 42, e.g., 42*a*-42*h*, each including one or more printheads 45, to the second end 29*b* of the platen plate 109; wherein the plurality of apertures 110 are configured to apply a vacuum 24 to the first surface 27*a* of the platen plate 109 from a vacuum source 25 connected 106 (FIG. 3) to the second surface 27*b* of the platen plate 109; wherein the plurality of apertures 110 include a group of apertures 110 located substantially below the print bar 42 that are configured to reduce flow induced by the applied vacuum 24 in the printing region 408*p*.

In some embodiments, an illustrative print bar 42 includes a plurality of printheads 45, wherein the plurality of apertures 110 below the print bars 42 includes a first group of apertures 110 located below each of the plurality of the printheads 45 that are configured to reduce the induced air flow in the printing region 408*p*, and a second group of apertures 110 located in one or more regions 408*n* other than below the printheads 45, which are configured to constrain a workpiece WP on the transfer belt 18. In some embodiments, the printheads 45 have a staggered arrangement, wherein the first group of apertures 110 has a staggered arrangement that matches the staggered arrangement of the printheads 45. In some such embodiments, the staggered arrangement of the apertures 110 that matches the staggered arrangement of the printheads 45 is configured to improve flattening of the workpiece WP, while mitigating deflection 112*d* of ink drops 102 jetted 141 toward the workpiece WP in the printing region 408*p*.

In some embodiments of the perforated platen 20, the second group of apertures 110 is configured to constrain a leading edge 67*a* (FIG. 2) of the workpiece WP on the transfer belt as the workpiece WP exits a printing region 408*p*. In some embodiments, the second group of apertures 110 is configured to constrain a trailing edge 67*b* (FIG. 2) of the workpiece WP on the transfer belt 18 before the workpiece WP enters a printing region 408*p*. In some embodiments, the second group of apertures 110 is configured to constrain a transverse edge 69, e.g., 69*a* and/or 69*b* (FIG. 2), of the workpiece WP on the transfer belt 18. In some embodiments, the applied vacuum 24 is configured to constrain the workpiece WP on the transfer belt 18, such as by preventing movement of the workpiece WP with respect to the transfer belt 18, and/or by flattening the workpiece WP against the transfer belt 18.

In some embodiments of the perforated platen 20, the limits along the travel direction of the envelope of the group of apertures 110 are configured to reduce the flow induced by the applied vacuum 24 are not perpendicular to the travel direction 34. In some such embodiments, the shape of the limits along the travel direction 34 of the envelope of the group of apertures 110 can be configured to reduce the flow induced by the applied vacuum 24 to mitigate the perturbation or deviation of the transition between low flow regions 408*p* and high flow regions 408*n*.

Figure 10:
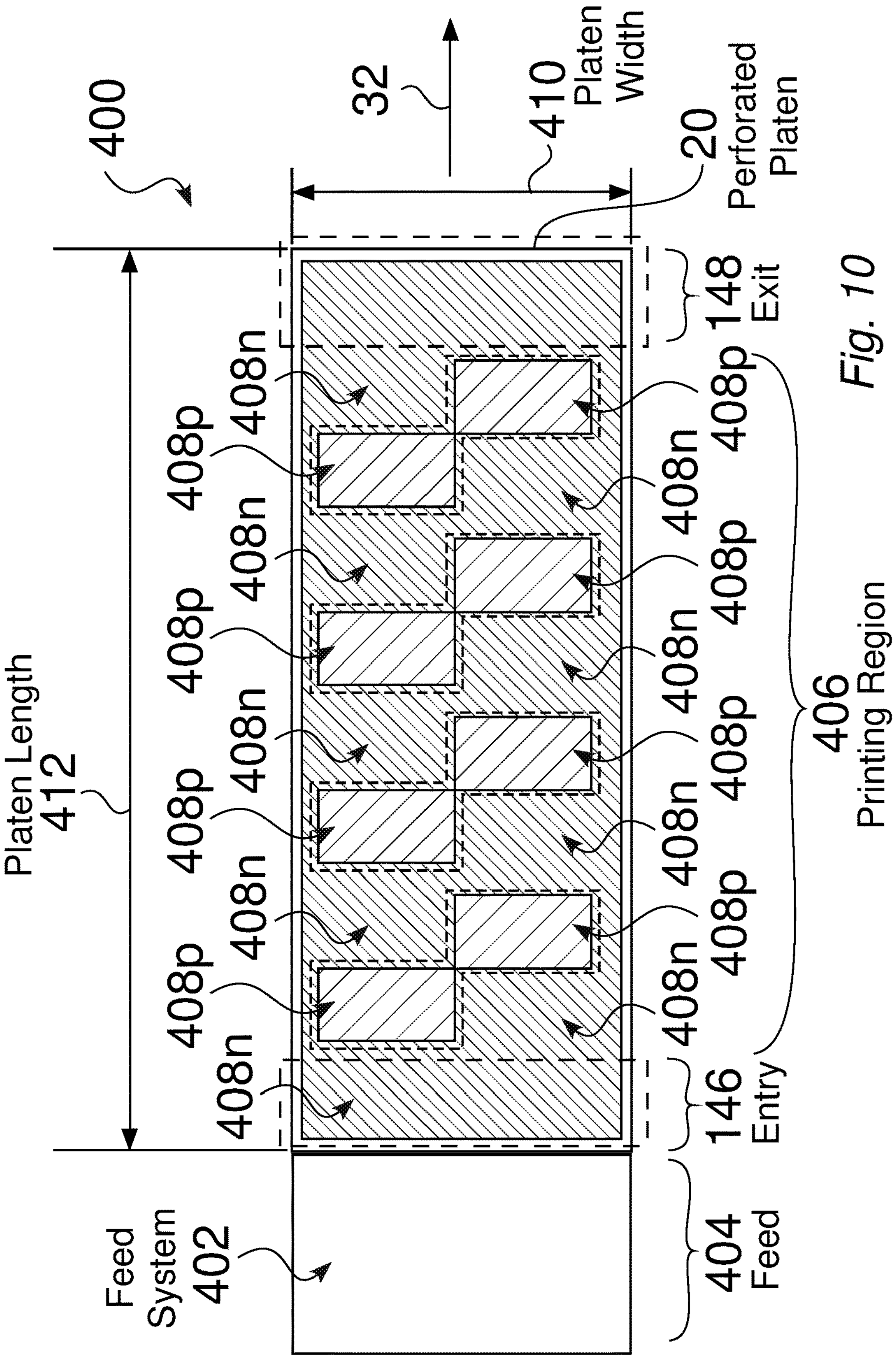
FIG. 10 is a simplified plan view of an illustrative platen for a printing system, which is configured to induce high air flow levels in non-printing regions, and low air flow levels in printing regions.

In some embodiments of the perforated platen 20, the platen plate 109 is comprised of a plurality of platen plates 502, e.g., 502*a*, 502*b* (FIGS. 12-15). In some embodiments, one or more of the plurality of platen plates 502 are any of movable or replaceable. In some embodiments, at least one of the platen plates 502 is configured to be located between the first end 29*a* of the platen 20 and the printing region 406 (FIG. 10). In some embodiments, at least one of the platen plates 502 is configured to be located between the printing region 406 and the second end 29*b* of the platen 20.

In some embodiments, a printing system 10 for mitigating deflection 112*d* of ink drops 102 in a printing environment includes: a perforated platen 20 having a first surface 27*a* and a second surface 27*b* opposite the first surface 27*a*, wherein the perforated platen 20 extends from a first end 29*a* to a second end 29*b* opposite the first end 29*a*; a perforated transfer belt 18 for transporting workpieces WP over the perforated platen 20 from the first end 29*a*, through a printing region 406 below at least one print bar 42 that includes one or more printheads 45, to the second end 29*b*; and a vacuum source 25 connected to the second surface 27*b* of the perforated platen 20, e.g., such as through a manifold 22, for applying vacuum 24 through the perforated platen 20 and the perforated transfer belt 18, to constrain the workpieces WP to the perforated transfer belt 18 as the workpieces WP are transported from the first end 29*b*, through the printing region 406, to the second end 29*b*; wherein the perforated platen 20 is configured to reduce flow induced by the applied vacuum 24 in regions 408*p* directly substantially below the print bar 42 than in regions 408*n* other than the regions 408*p* substantially below the print bar 42.

Figure 2:
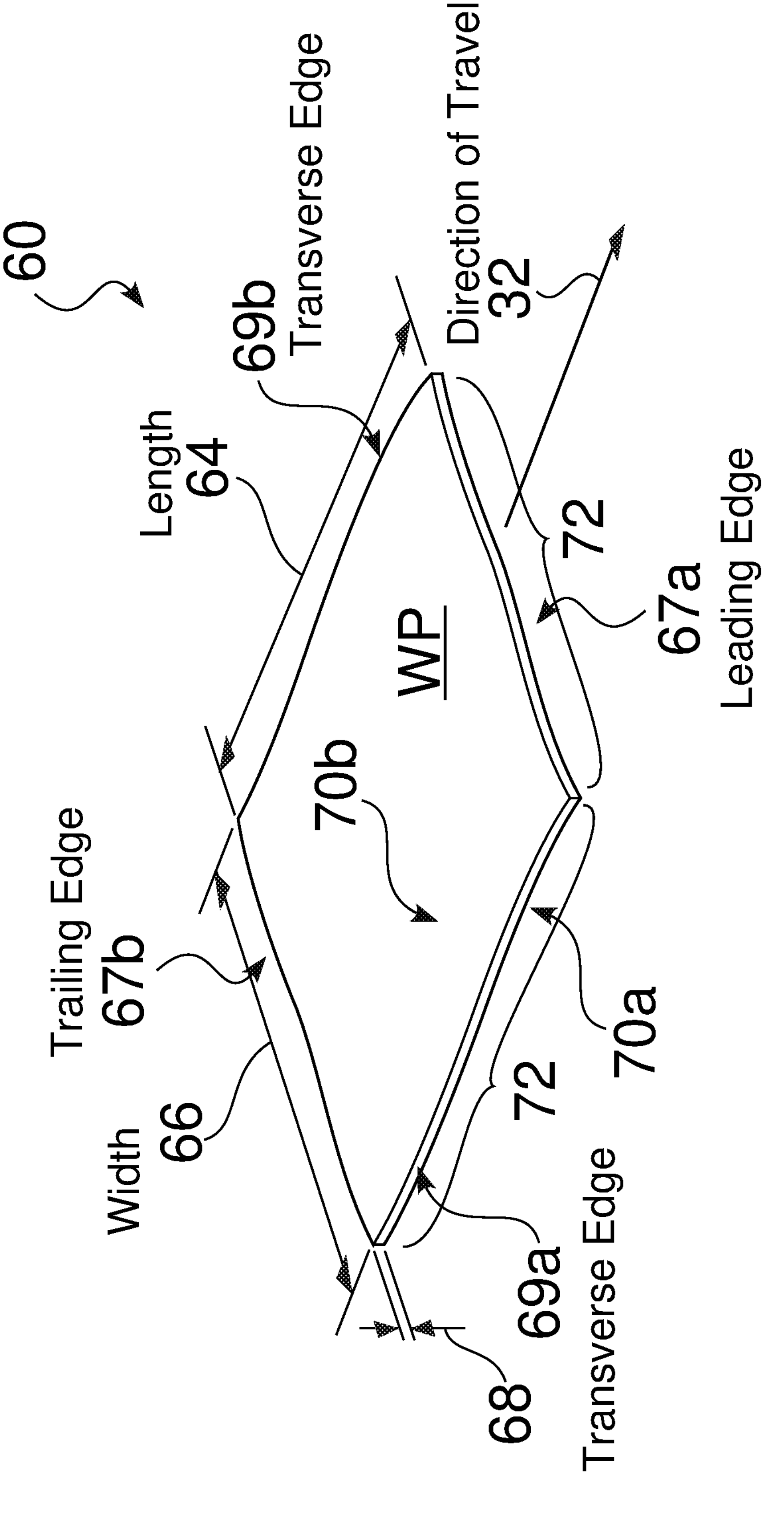
FIG. 2 is a schematic view of an illustrative workpiece, such as having a characteristic length, width, and thickness, and opposing surfaces, in which the workpiece can include one or more non-planar features.

FIG. 2 is an illustrative view 60 of an illustrative workpiece WP, such as having a characteristic length 64, width 66, and thickness 68, and opposing surfaces 70*a*, 70*b*. While the illustrative workpiece WP shown in FIG. 2 is shown as having a characteristic length 64, such as for printing of separate sequentially transferred workpieces WP through a printing region 103 (FIG. 3), other embodiments of the printer vacuum table systems 11 and printing systems 10 can be used for a workpiece WP that is longer than the vacuum table system 11, such as for a workpiece WP that is passes into the print region 103 from a transfer roll. The illustrative workpiece WP shown in FIG. 2 has a leading edge 67*a*, a trailing edge 67*b* opposite the leading edge 67*a*, and opposing transverse edges 69*a*, 69*b*.

The first surface 70*b* of the illustrative workpiece WP shown in FIG. 2 can represent a surface 70 upon which graphics 104 (FIG. 3) are to be printed 141 (FIG. 5), while the opposing surface 70*a* can represent a surface 70 that can be constrained by a perforated transfer belt 18 that is configured to transfer the workpiece WP in the print direction 32 through a printing region 406 (FIG. 10). In this manner, vacuum 24 can controllably be applied (e.g., FIGS. 1,3), such as to compensate for non-planar features 72 of the workpiece WP.

Workpieces WP to be printed, such as paper, paperboard, corrugated cardboard, or other media, can often include surfaces 70 that are other than flat, such as including convex or concave features 72, or other features 72 that are either consistent to the workpieces WP or are specific to one or more specific workpiece items WP. For instance, a workpiece WP may often include convex or concave features 72 across its width 66 or length 64, such as based on a general characteristic of the workpiece WP, or based on the particular characteristics of one or more separate workpieces WP to be printed.

The illustrative printer vacuum table conveyor system 11 seen in FIG. 1 comprises a transfer belt 18 that extends between a plurality of rollers 16, e.g., 16*a*, 16*b*, which are rotatably mounted with respect to a chassis 12. It should be understood that the illustrative printing system 10 seen in FIG. 1 provides a simplified view of the printing system 10. For example, the printer vacuum table conveyor system 11 can further comprise one or more additional rollers, such as a tension roller 52 associated with a tension mechanism 132 (FIG. 4), and/or the rollers 16 and transfer belt 18 can further comprise a belt interlock mechanism 156 (FIG. 5), such as but not limited to a plurality of teeth 156 that intermesh. As well, some illustrative embodiment of the enhanced printing system 10 can include additional structures and mechanisms to provide improved dimensional tolerances for any of setup, operation, or longevity.

The illustrative printer vacuum table conveyor system 11 seen in FIG. 1 is typically operated upon by a drive mechanism 26, which controllably rotates one of the rollers 16, e.g., 16*a*, thus producing movement 32 of the transfer belt 18, by which one or more workpieces WP, e.g., boards WP, are controllably moved, such as to be operated upon at one or more locations with respect to the system 10. While the illustrative printing system 10 is described herein with respect to one or more workpieces WP, e.g., paper board WP, it should be understood that the structures and systems described herein can readily be implemented for a printing system 10 associated with other workpieces or substrates WP, such as but not limited to any of paper, film, cardboard, tile, or other articles of manufacture.

The drive mechanism 26 typically comprises a drive motor 242 (FIG. 7) and a coupling mechanism, e.g., a transfer drive 244 (FIG. 7), wherein the drive motor 242 is controllably powered through a controller 21, e.g., a programmable logic controller (PLC). In some embodiments, the drive mechanism 26 can include one or more enhanced structures, to provide highly accurate and repeatable location and movement.

The illustrative print system 10 seen in FIG. 1 includes an encoder 28, such as to provide accurate controlled movement 32 of the transfer belt 18 through the drive mechanism 26. The controller 21 typically comprises one or more processors 23, e.g., 23*a*-23*e*, and can also comprise storage 25, e.g., memory, such as for but not limited to storage of any of operating parameters, thresholds, operational history, and/or tracking. In some embodiments, the controller 21 is configured to control all of the movements and operations in the printing system 10, such as for any of movement of the transfer belt 18 through the drive mechanism 26, and the coordinated operations of the printheads 45, which in some embodiments are integrated within print bars 42, e.g., 42*a*-42*h*, and/or feeding 712 (FIG. 19) of workpieces WP by a feed system 402 (FIG. 10).

As also seen in FIG. 1, a display 34 and user interface 36 are also typically connected to the controller 21, such as to provide input from a user USR, e.g., an operator, and/or to provide information to the user USR. As well, the printing system 10 can further comprise a communications link 46, through which the controller 21 may preferably be configured to transmit an output signal 48 and/or receive an input signal 50.

Figure 4:
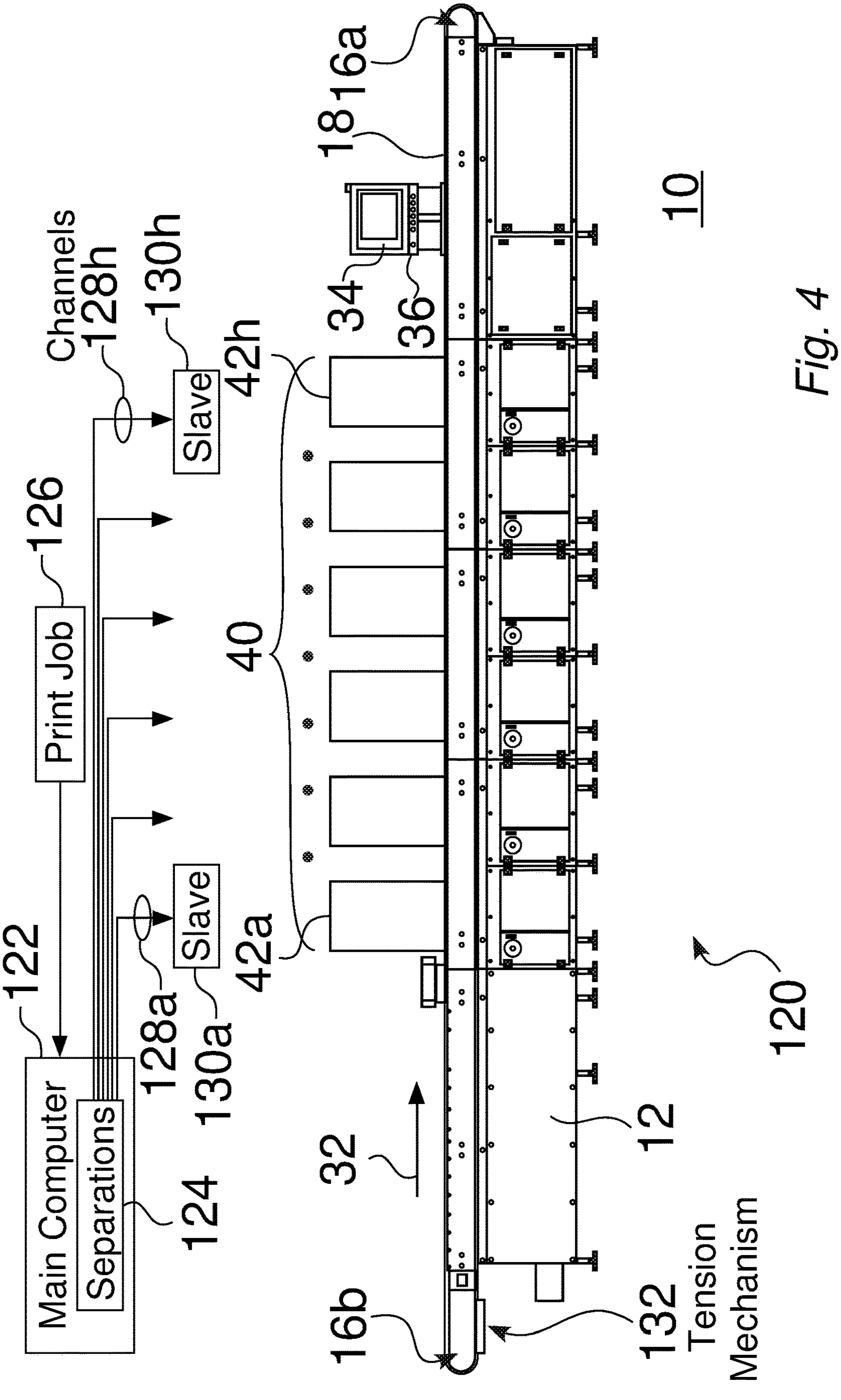
FIG. 4 is a side view of an illustrative printing system having drop deflection compensation.
Figure 5:
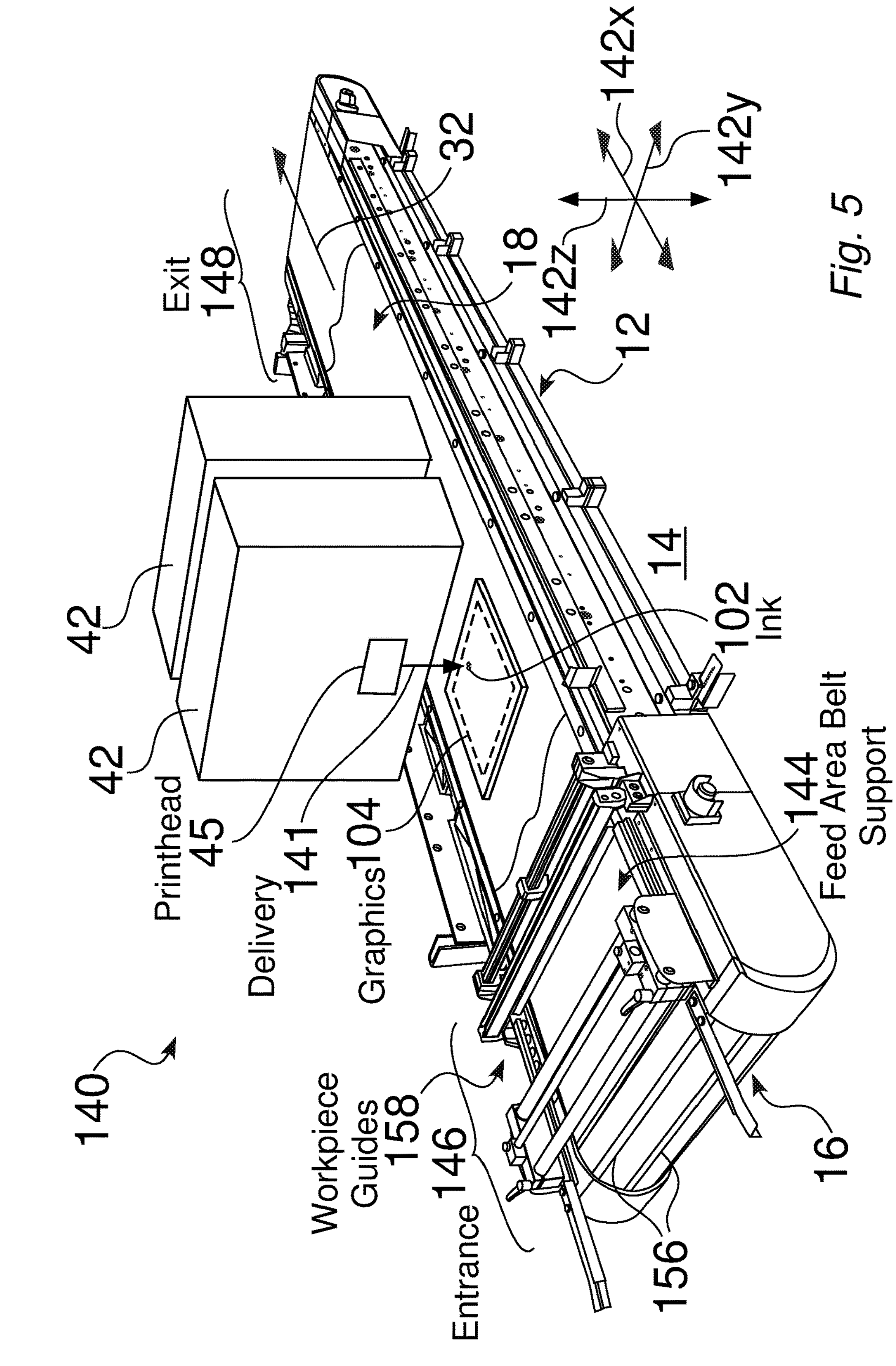
FIG. 5 a detailed partial perspective view of an illustrative conveyor assembly associated with a printing system having drop deflection compensation.

FIG. 4 is a side view 120 of an illustrative printing system 10 having drop deflection compensation. FIG. 5 a detailed partial perspective view 140 of an illustrative vacuum conveyor system 11 associated with a printing system 10 having drop deflection compensation.

The illustrative printing system 10 seen in FIG. 4 and FIG. 5 is configured for printing on workpieces WP, and in some embodiments can include one or more workpiece guides 158, upstream of one or more of the print bars 42, such as at the entrance area 146 (FIG. 5) of the transfer belt 18. Workpieces WP that are placed on the transfer belt 18 may not initially be located with a great degree of accuracy, and/or may be twisted, i.e., rotated. The workpiece guides 158 ensure that workpieces WP are in the proper location on the transfer belt 18, e.g., in the middle, and that the workpieces WP are acceptably straight, e.g., within an acceptable threshold.

Figure 6:
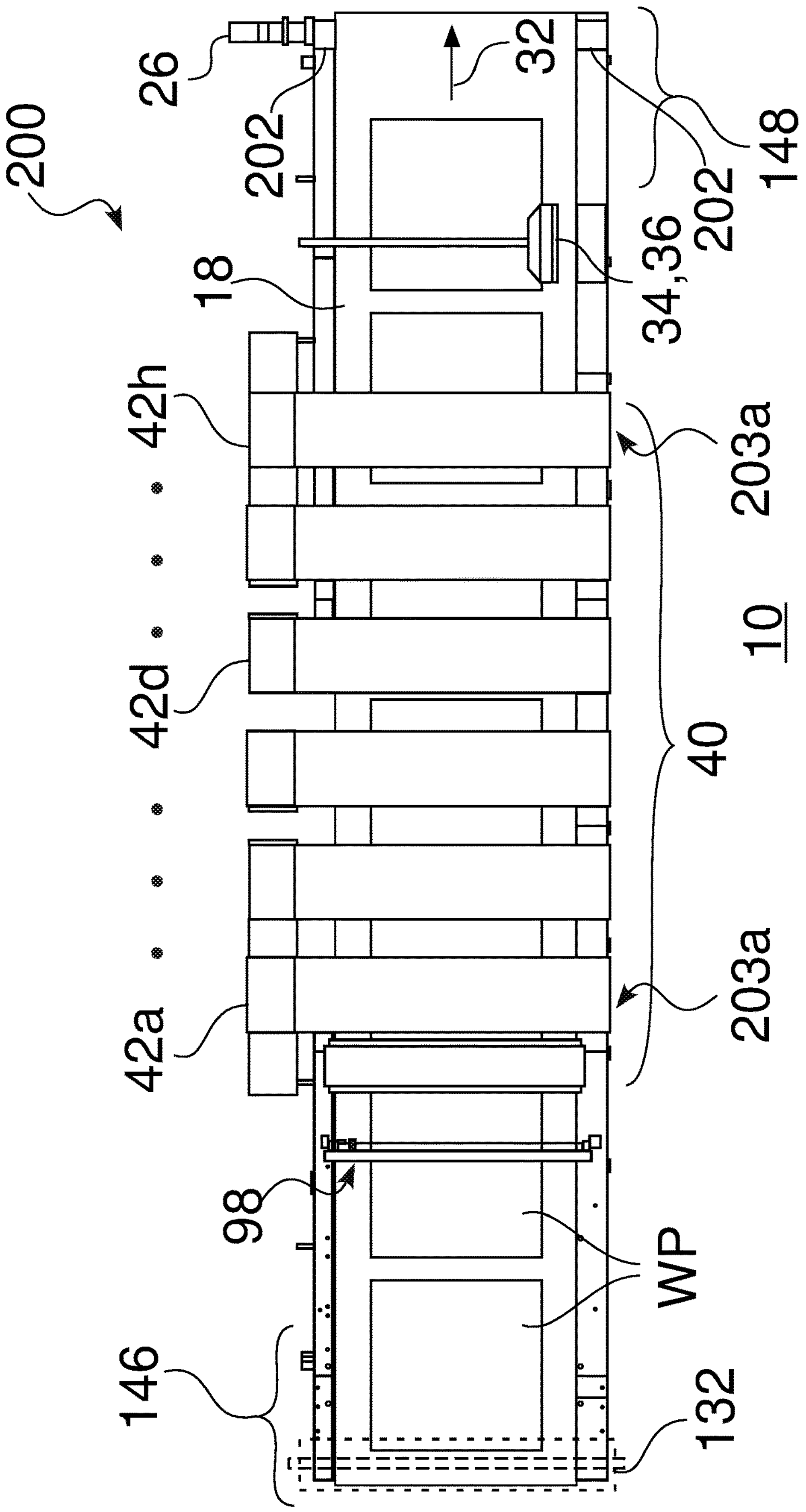
FIG. 6 is a plan view of an illustrative printing system having drop deflection compensation, wherein having a plurality of print bars, such as including staggered printheads.

The illustrative printer system 10 seen in FIGS. 4-6 can include an enhanced tension adjustment mechanism 132 for the transfer belt 18. For example, such as during any of initial setup, belt replacement, or other service, a threaded, i.e., guide screw mechanism 202 (FIG. 6) may be rotatably moved, such as to provide a fine adjustment of linear distance between the rollers 16, e.g., 16*a*, 16*b*, to obtain a desired tension in the transfer belt 18, such as recommended by the manufacturer of the transfer belt 18.

Similarly, for adjustment of parallelism between the rollers 16, some embodiments of the tension mechanism 132 can include a pair of guide screws 202, e.g., 202*a*, 202*b*, on opposing sides of at least one of the rollers 16, e.g., 16*a* or 16*b*. One or both of the guide screws 202, e.g., 202*a* and/or 202*b*, may preferably be adjustable, to achieve parallelism between the roller 16 and transfer belt 18, i.e., to achieve 90 degrees between the axis of the roller 16 and the longitudinal axis of the transfer belt 18.

In some embodiments, a guide screw set 102 associated with a first roller 16, e.g., 16*a*, may be considered a main or primary guide mechanism 102, which may be adjustable for parallelism, when the corresponding roller 16 is free for adjustment of any of parallelism or tension, i.e., not locked down, such as when the position of the opposing roller 16, e.g., 16*b*, is maintained. Similarly, the opposite roller 16, e.g., 16*b*, may be adjustable for any of parallelism or tension, i.e., not locked down, such as when the position of the opposing roller 16, e.g., 16*a*, is maintained. The operator USR can then determine when the roller 16 is aligned with the workpiece guide 98, which assures that the transfer belt 18 is parallel to the opposing roller 16 and properly aligned with the transfer belt 18.

As described below, some embodiments of the printing system 10 include sequential feeding of workpieces WP, which is also synchronized to the perforated transfer belt 18, such that some embodiments require the relative location of the perforated transfer belt 18 to be known with respect to the workpieces WP.

Once the transfer belt 18 is adjusted to be parallel, with adequate tension, the guide screw mechanism 202 is tightened, and the workpiece guide 98 is put back in place. Upon completion, the operator USR may start up the illustrative printing system 10 in a test mode, such as to confirm that the guide is not getting hot, e.g., from excessive friction. If not, the illustrative printing system 10 may be put into or returned to service. If the temperature of the workpiece guide 98 increases excessively during testing, the operator or service personnel USR may repeat one or more of the procedures as necessary, and retest. After setup, the owner or operator USR, does not typically need to reset the tolerance, as the rollers 16 and transfer belt 18 are dimensionally stable, such as for the expected lifetime of the transfer belt 18.

An illustrative printing operation is also seen in the in FIG. 4, wherein a print job 126, such as received from a remote terminal, e.g., an artist or designer, arrives at a main computer 122, which may be associated with the controller 21. In some system embodiments, the print job 126 comprises a tagged image file format (TIFF) print job 126.

The main computer 122 then typically produces, i.e., RIPs, a raster image file from the received print file 126, through which the main computer 122 makes appropriate separations 124, which are assigned to one or more channels 128, e.g., 128*a*-128*h*, as necessary to print the image. Each of the channels 128, e.g., 128*a*-128*h*, are sent to a corresponding slave computer or processor 130, e.g., 130*a*-130*h*, associated with each print bar 42, e.g., 42*a*-42*h*, for printing respective colors or other coatings on the workpieces WP. The slave computers or processors 130 can be independent of or integrated with corresponding print bars 42. The different print bars 42, e.g., 42*a*-42*h*, are controlled by the respective slave computers 130, wherein each slave computer 130, e.g., 130*a*, operates in conjunction with a respective print bar 42, e.g., 42*a*, i.e., one channel for each slave computer 130.

While the main computer 122 is making the RIP, the printing system 10 is typically configured to work with the graphics that are loaded into the slave computers 130. When each of the slave computers 130 has the information for their respective print bar 42, the slave computer 130 connects, e.g., through a high-performance computing (HPC) card, to each of the printheads 45. In some printing system embodiments 10, each printhead 45 has a dedicated HPC card, for local processing.

The controller 21 may preferably be configured, such as through the programmed processors 23, e.g., 23*a*-23*e*, to provide integral printer management capabilities, and/or to optimize the printer's capabilities across its options. The controller 21 and processors 23 may preferably be remotely updatable, such as through the communications link 46, which enables the worker USR to handle all the elements fast and intuitively.

In some embodiments, the printing system 10 can include additional features, such as any of a tone adjustment system (TAS), calculated linearization capabilities, and/or calculate ink consumption capabilities. The tone adjustment system (TAS) may preferably be based on an intuitive interface, such as displayed 36, which guides the user USR through the process of study and application of changes in tone or intensity, to apply to a model. This feature enables adjustments or variations on existing models in the illustrative printing system 10, without use of external additional software, or extensive knowledge in color management.

In some embodiments, the electronic design of the printing system 10 can be based on the modular distribution of components, thus facilitating future upgrades and allowing full accessibility. In some embodiments, the electronic system of the printing system 10 can deliver high performance, by using the main computer 122 to upload image files, i.e., print jobs 126, and slave computers 130 that manage the printing of the image files 126. The result is increased graphical variability and nonstop manufacturing. The enhanced electronics design makes it possible to choose from various printing options, and simultaneously use different printheads 45 in the same printing system 10, e.g., some for jetting graphic designs, and others to apply any of undercoating, primer, overcoating, or effects.

FIG. 5 is a detailed partial perspective view 140 of an illustrative printer vacuum table conveyor system 11 associated with a printing system 10, wherein the transfer belt 18 moves in a direction of travel 32 with respect to an X axis 142*x*, a Y axis 142*y*, and a Z axis 142*z*. The illustrative print bars 42 seen in FIG. 5 can be fixedly locked with respect to the chassis 12.

Figure 7:
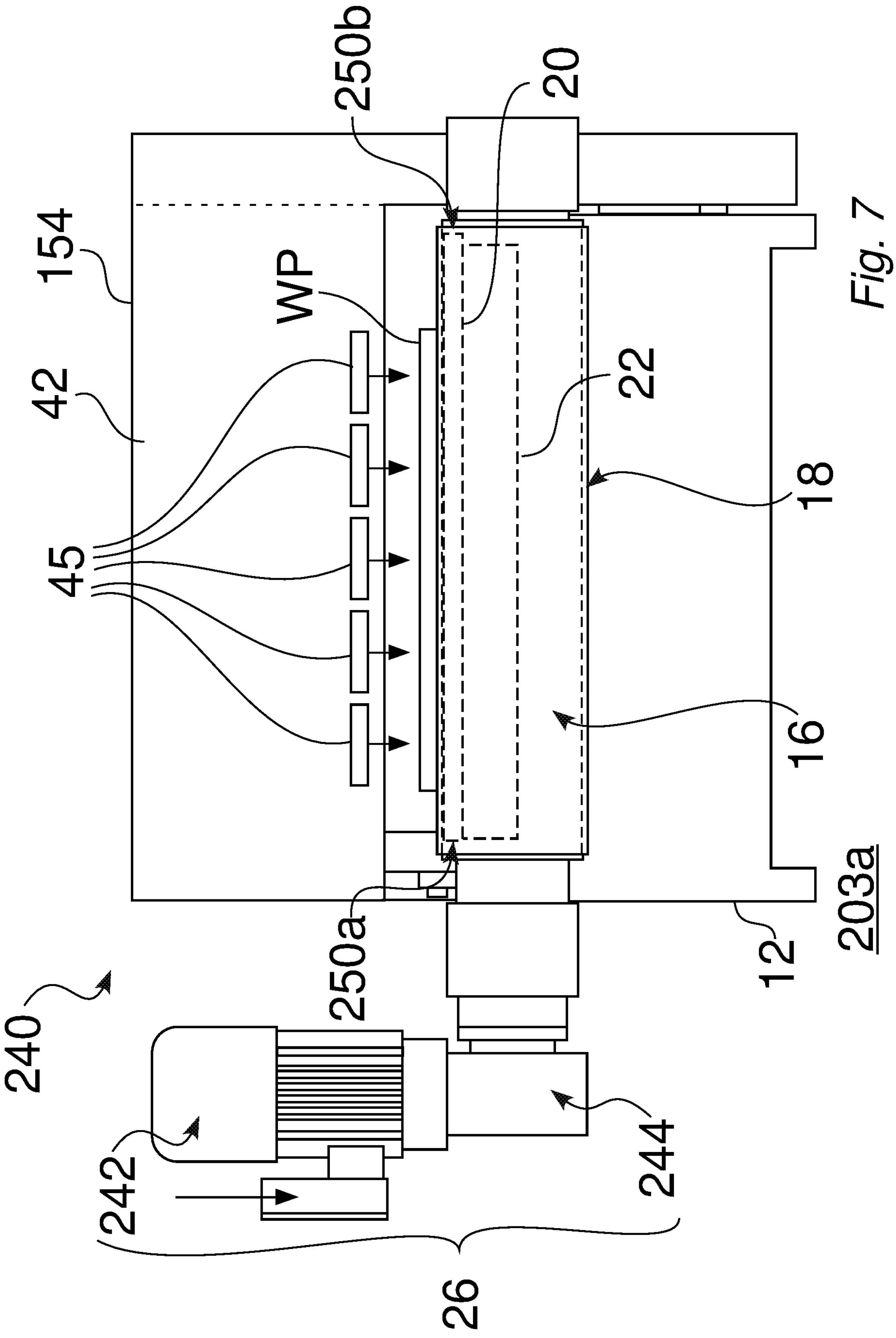
FIG. 7 is an end view showing an illustrative conveyor drive mechanism, and showing one or more printheads within a print bar.

FIG. 6 is a plan view 200 of an illustrative printing system 10, wherein each of the print bars 42 are in an aligned and locked position 203*a* in relation to the chassis 12. In some embodiments, the plurality of print bars 42, e.g., 42*a*-42*h*, comprise separate, i.e., independent, modular print bars 42. FIG. 7 is an end view 240 which shows an illustrative conveyor drive mechanism 26, and also shows one or more printheads 45 within a print bar 42, such as including a print bar frame 154.

Figure 8:
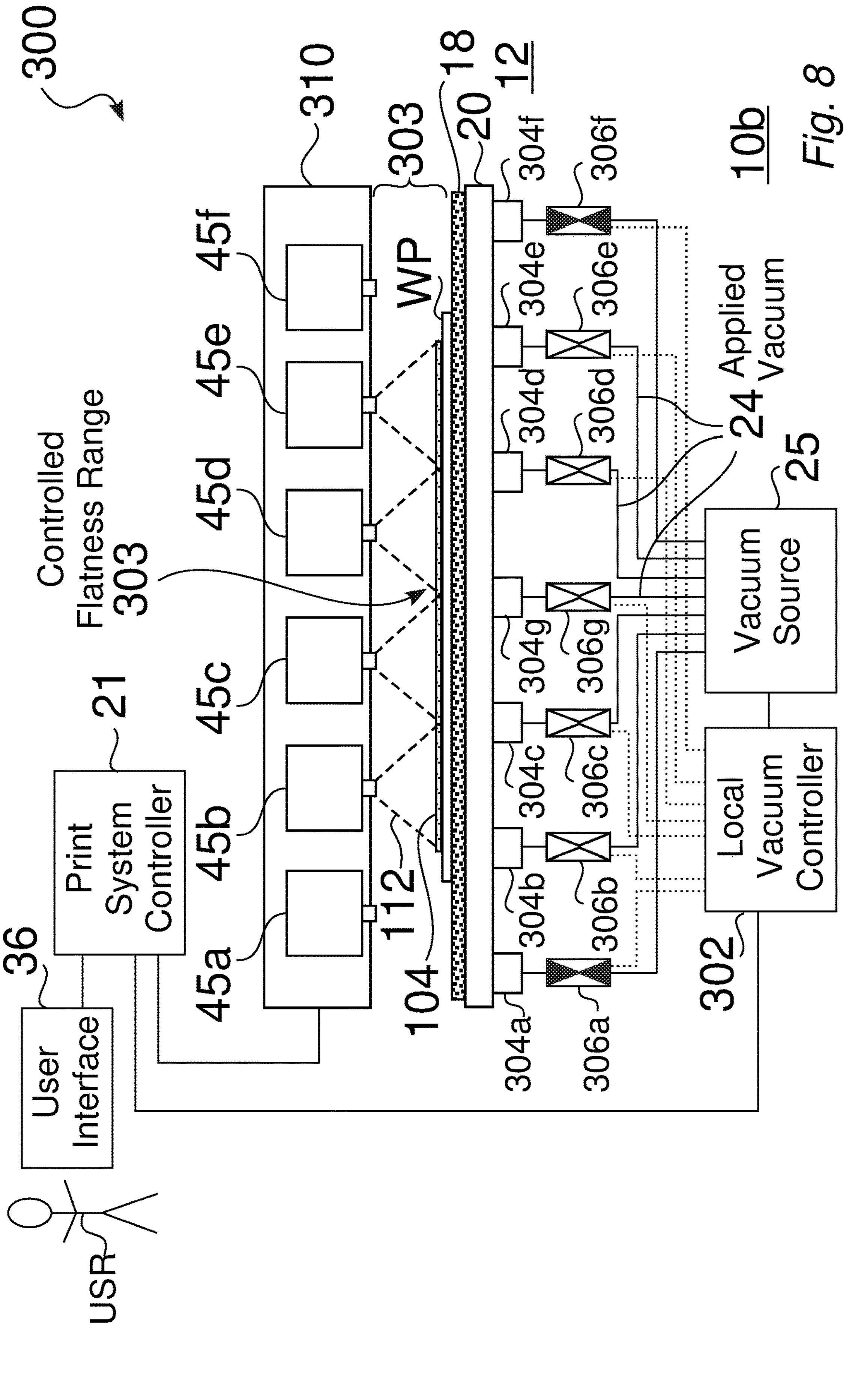
FIG. 8 is a schematic end view of a workpiece located within a printing region of an illustrative printing system having a printer vacuum table that includes a plurality of vacuum zones, in which an applied vacuum can be disabled for outer transverse non-printing regions.

The printing system 10 can be implemented for a wide variety of vacuum conveyor systems 11, such as for print systems 10 in which vacuum is applied across the entire width 410 (FIG. 10) of the platen 20, and/or for print systems 10 which include multiple vacuum zones 304, e.g., 304*a*-304*g* (FIG. 8).

For instance, FIG. 8 is an end schematic view 300 of a workpiece WP located within a printing region 303 of a printing system 10, e.g., 10*b*, having a printer conveyor vacuum table system 11 that includes a plurality of vacuum zones 304, e.g., 304*a*-304*g*, wherein the printing system 10 is configured to hold the workpiece WP with a flatness range 303 that allows high definition printing 141 onto the upper surface 70*b* of the workpiece WP.

FIG. 8 is a side schematic view 300 of a workpiece WP located within a printing region 303 of an illustrative printing system 10, e.g., 10*b*, having a printer vacuum table system 11, in which the printer vacuum table system 11 is configured to apply vacuum 24 to a workpiece WP from one or more illustrative vacuum zones 304 located below the printer vacuum surface 14. For instance, the illustrative perforated platen 20 seen in FIG. 3 can be permeable or can include holes, passages or conduits 110 defined therethrough, to transfer an applied vacuum 24 to a workpiece WP, from one or more of the vacuum zones 304, in which each of the vacuum zones 304 includes holes, passages or conduits 110 defined therethrough for applying vacuum 24, such as from the vacuum source 25.

The flatness range 303 of the workpiece WP is accomplished by controlled application of vacuum 24 through one or more vacuum zones 304, such as vacuum zones 304 that coincide with the workpiece WP to be printed 141. For instance, the illustrative workpiece WP seen in FIG. 8 is shown as being center aligned with respect to the width 20 of the printer vacuum surface 14, such that the workpiece WP is located over some of the plurality of vacuum zones 304, e.g., 304*b*, 304*c*, 304*g*, 304*d* and 304*e*. As also seen in FIG. 8, the center-aligned workpiece WP does not coincide with the peripheral vacuum zones 304*a* and 304*f*.

The illustrative printing system 10*b* seen in FIG. 8 includes a printhead assembly 310, e.g., a print carriage 310, that includes one or more printheads 45, e.g., 45*a*-45*f*, for controllable delivery 141 of ink 102, and a corresponding print system controller 21 and user interface 110 for interaction with a user, i.e., operator USR. The illustrative printhead assembly 310 seen in FIG. 8 is shown as extending over the width 20 of the printer vacuum surface 14, and is stationary with respect to the printer vacuum table 12, for printing on one or more workpieces WP as the workpieces WP are advanced on a perforated transfer belt 18 in the print direction 32. In some embodiments of the printing system 10, the printhead assembly or carriage 310 can be moved vertically, e.g., 142*z* (FIG. 5), such as to compensate for workpieces WP having an increased thickness 68 (FIG. 2).

The illustrative print system 10*b* seen in FIG. 8 includes a vacuum source 25, e.g., a vacuum blower 25, which can be controlled either locally, through a local controller 302, or from the print system controller 21, to apply vacuum 24 to one or more vacuum zones 304 that are enabled. For instance, vacuum zones 304*b*, 304*c*, 304*d*, 304*e* and 304*g* shown in FIG. 8 are enabled to apply vacuum 24 through corresponding open valves 306*b*, 306*c*, 306*d*, 306*e* and 306*g*, respectively, while vacuum zones 304*a* and 304*f* shown in FIG. 8 are disabled to prevent the application of vacuum 24 through corresponding closed valves 306*a* and 306*f*, respectively, because vacuum zones 304*a* and 304*f* do not coincide with the workpiece WP within the printing region 303.

While the illustrative print system 10*b* seen in FIG. 8 includes valves 306 to limit flow of vacuum 24 in one or more lateral zones 304, some embodiments can alternately include limiting plates that extend longitudinally below the perforated platen 20, such as to reduce or close a passage of the vacuum aspiration 24 on the zones 304 that are not covered by the parts on the platen. For instance, for workpieces WP that sequentially transported on the perforated transfer belt, which do not extend across the width 410 of the platen, the workpieces WP can be center-aligned, right aligned, or left aligned, such as with respect to the transverse axis 142*y* (FIG. 5). As such, one or more zones 304 can be disabled by one or more limiting plates that extend longitudinally below the perforated platen.

Figure 9:
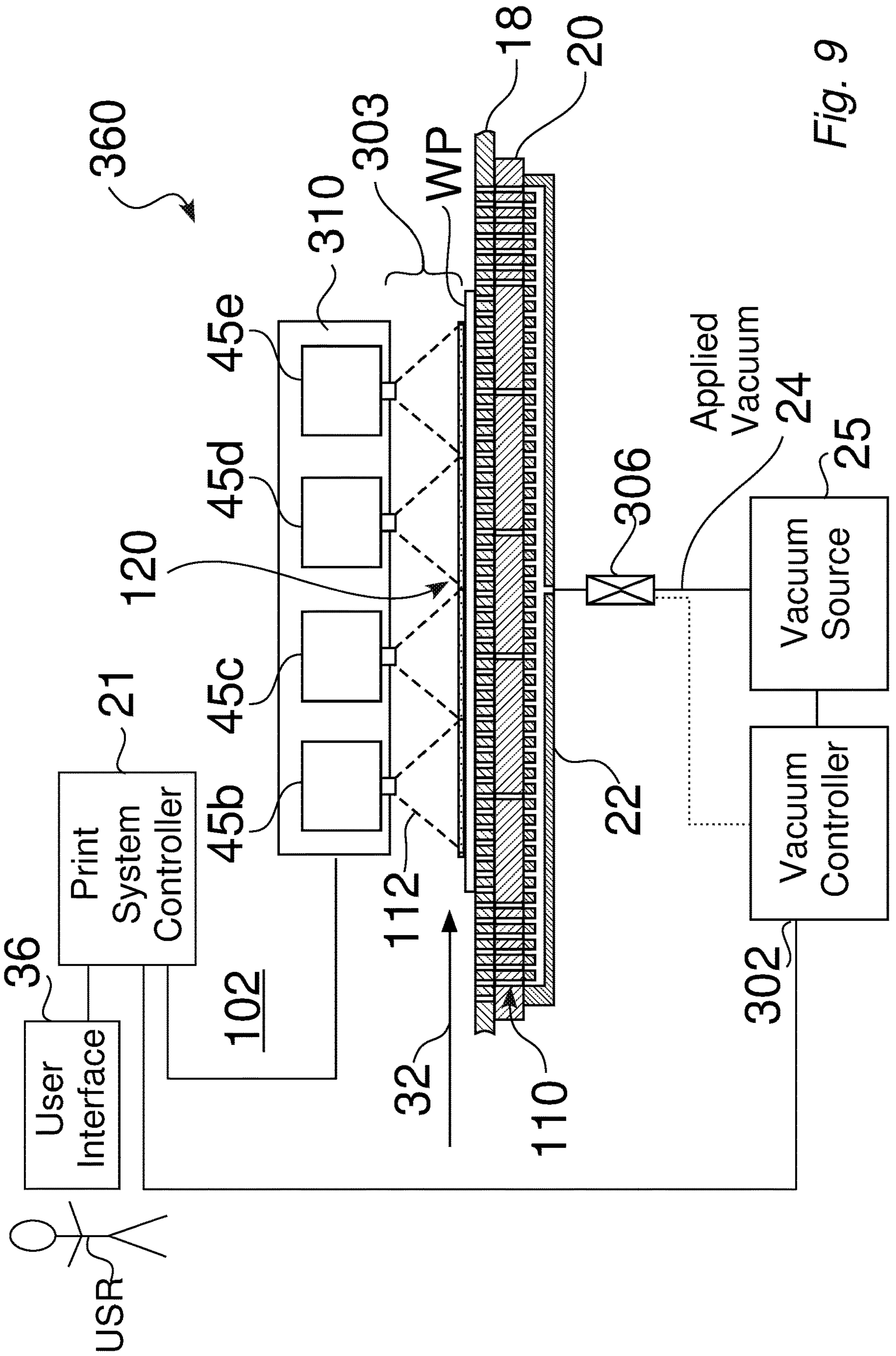
FIG. 9 is a side schematic view of a workpiece located within a printing region of an illustrative printing system having a printer vacuum table, in which the vacuum table is configured to apply vacuum to a substrate from a vacuum manifold located below the printer table surface, in which more air flow is induced in non-printing regions, and less air flow is induced in regions that are substantially aligned with the printheads.

FIG. 9 is a side schematic view 360 of a workpiece WP located within a jetting region 303 of an illustrative printing system 10 having a printer vacuum table 14, in which the printer vacuum table 14 is configured to apply vacuum 24 to a workpiece WP through a vacuum manifold 22 located below the printer table surface 20, in which more air flow 24 is induced in non-printing regions 408*n* (FIG. 10), and less or no air flow 24 is induced in regions 408*p* (FIG. 10) that are substantially aligned with the printheads 45.

FIG. 10 is a simplified plan view 400 of an illustrative perforated platen 20 for a printing system 10, which is configured to induce high air flow levels in non-printing regions 408*n*, and low air flow levels in printing regions 408*p*. The illustrative platen 20 seen in FIG. 10 includes staggered printing regions 408*p*, such as corresponding to staggered printheads 45 located above the platen 20, e.g., four sets of staggered printheads 45 for four color inkjet printing 141 (cyan (C), magenta (M), yellow (Y), and black (K)). Alternate configurations can be used, such as for printing any of one or more process or spot colors, primer or undercoat layers, and/or overcoat layers. In some embodiments, the use of staggered printheads 45 and staggered printing regions 408*p* helps to constrain workpieces WP during the printing process, while mitigating ink drop deflection 112*d*. The illustrative platen 20 seen in FIG. 10 has a characteristic width 410 and length 412, and can be integrated with a feed system 402, such that, in operation, workpieces WP in a feed region 404 are sequentially fed onto the transfer belt 18, though the entry region 146, the printing region 406, and the exit region 148, along a direction of travel 32.

The illustrated perforation patterns 110 seen in FIG. 11 can thus be configured to correspond to different regions 408 below the printheads 45, such as to achieve a flow reduction effect in the regions 408, e.g., 408*p*, where it is necessary to mitigate ink drop deflection 112*d*, while the rest of the vacuum table area 408 e.g., regions 408*n*, can be freely designed for optimum workpiece substrate WP flattening performance.

Figure 17:
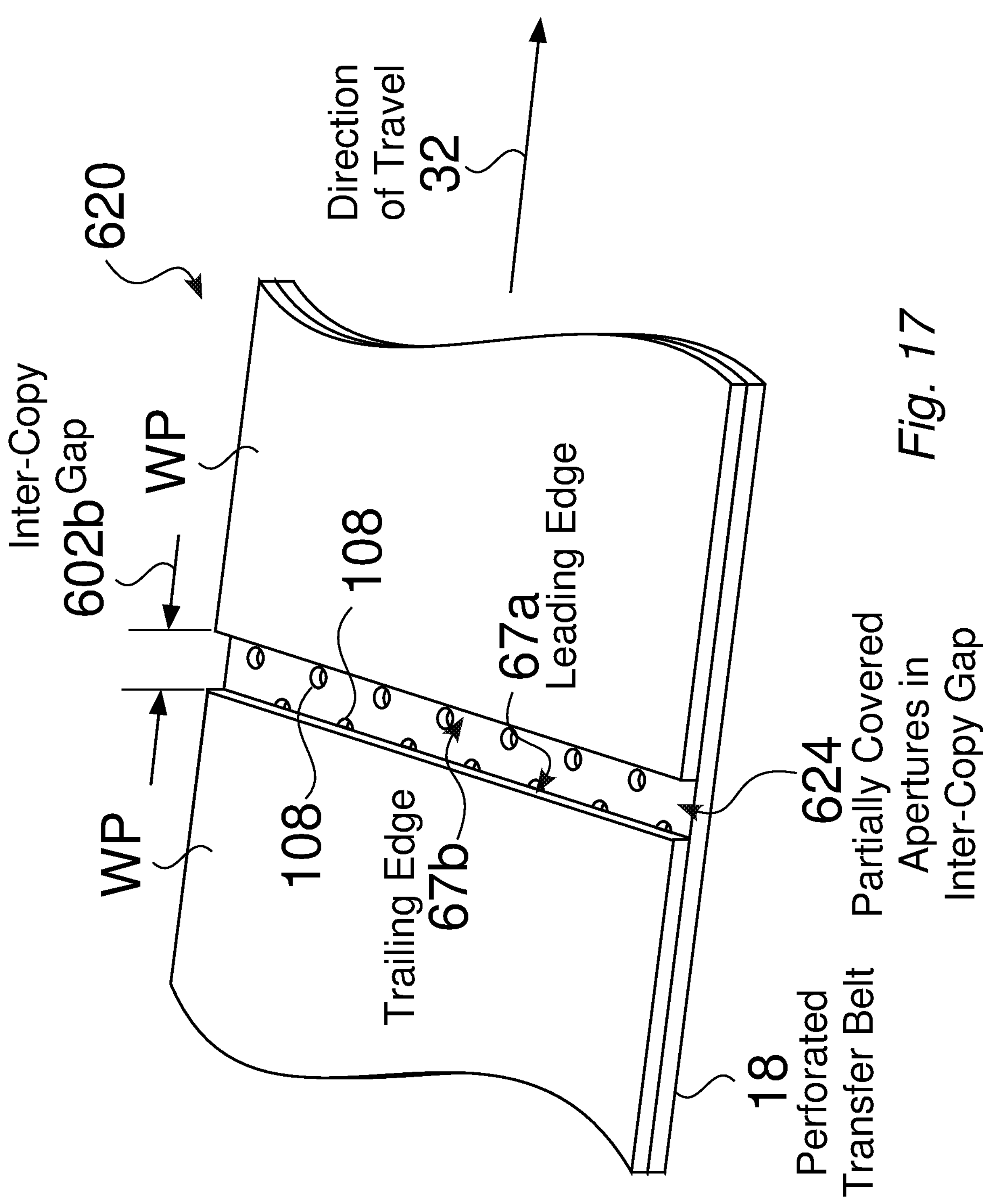
FIG. 17 is a schematic view of sequential feeding of substrates on a perforated transfer belt, in which some of the belt apertures are partially covered by at least one of the workpieces in the inter gap region between sequentially transferred workpieces.

This flow reduction effect can be detrimental for the flattening performance of the vacuum transport system 11, particularly in cases where a workpiece substrate WP is severely warped along its transverse edges 69*a*, 69*b*, and when there are transfer belt holes 108 partially covered by the workpiece substrate WP, such as seen in FIG. 17. Under such conditions, maximum air flow 24 may be needed to keep the workpiece substrate WP as flat as possible; hence an air flow reduction may induce a spring-back action of the workpiece substrate WP.

The illustrative perforated platen 20 can reconcile these conflicting goals, by introducing perforation patterns 408*p* that are designed for air flow reduction in the same staggered arrangement as the printheads 45, and preserve the perforation pattern, e.g., 408*n*, of the rest of printer platen 20, in the space between printheads 45. This configuration combines low air flow and high air flow regions 408, in which the low air flow regions 408*p* below the printheads 45 ensure that the ink drops 102 (FIG. 3) are not deflected 112*d*, while increased flow of applied vacuum 24 in the high air flow regions 408*n* compensates for the reduced flow of applied vacuum 24 in the other regions 408*p*, and thus can keep the workpiece substrate WP flat in unfavorable conditions.

In an illustrative embodiment, a conveyor system 11 is configured for transferring substantially planar workpieces WP through a longitudinal path through a printing region 406 located below a print bar 42 that includes one or more printheads 45, wherein the conveyor system 11 includes: a transfer belt 18 that is configured to travel from a first end 29*a* to a second end 29*b* along the longitudinal path 32, the transfer belt 18 including a plurality of belt apertures 108 defined therethrough, wherein the belt apertures 108 are arranged as a series of evenly spaced rows 642 (FIG. 18) of belt apertures 108 that extend transversely across the transfer belt 18, wherein a portion of the belt apertures 108 located under the substantially planar workpieces WP are configured to apply a vacuum 24 to a lower surface 70*a* (FIG. 2) of each of the substantially planar workpieces WP, to constrain the substantially planar workpieces WP to the transfer belt 18 through the printing region 408*p*; and a feed system 402 that is configured to feed the plurality of substantially planar workpieces WP onto the transfer belt 18 in a synchronized manner with respect to the evenly spaced rows 642 of belt apertures 108 that extend transversely across the transfer belt 18, to ensure that there are no belt apertures 108 that are partially covered by any of a trailing edge 67*b* (FIGS. 16-18) or a leading edge 67*a* (FIGS. 16-18) of any of the substantially planar workpieces WP within a longitudinal gap 602, e.g., 602*a*-602*c* (FIGS. 16-18) defined between a trailing edge 67*b* of each of the workpieces WP and a leading edge 67*a* of a sequential one of the workpieces WP.

In some embodiments, the prevention of partially covered belt apertures 108 within the longitudinal gap 602 (FIGS. 16-18) between successive substantially planar workpieces WP is configured to reduce deflection 112*d* of ink drops 102 as they are delivered 141 within the printing region 408*p*. In some embodiments, the prevention of the belt apertures 108 within the longitudinal gap 602 between successive substantially planar workpieces WP is configured to reduce flow rate requirements of the vacuum system 25 for the printing region 408*p* substantially below the print bar 42. In some embodiments, the printing system 10 includes a feed system 402 that is configured to feed the workpieces WP onto the perforated transfer belt 18 in a synchronized manner with respect to rows 642 of belt apertures 108 that extend transversely across the transfer belt 18, to ensure that there are no belt apertures 108 that are partially covered by any of a trailing edge 67*b* or a leading edge 67*a* of any of the workpieces WP within a longitudinal gap 602 defined between a trailing edge 67*b* of each of the workpieces WP and a leading edge 67*a* of a sequential one of the workpieces WP.

Figure 11:
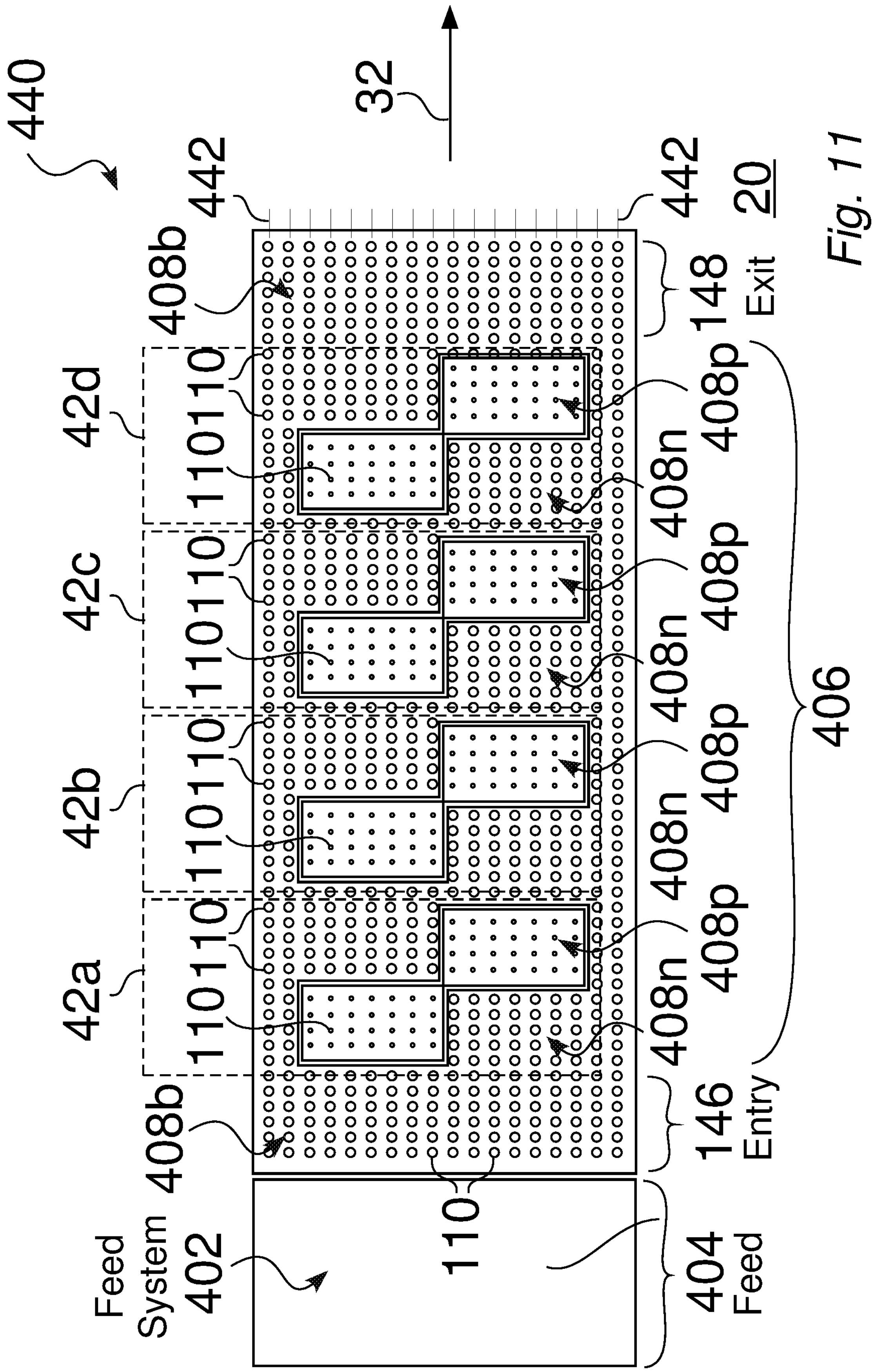
FIG. 11 is a detailed view if an illustrative platen for a printing system, which is configured to induce high air flow levels through platen apertures in non-printing regions, and low air flow levels through platen apertures in printing regions, wherein the platen apertures are configured in rows to generally align with apertures defined through a transfer belt.

FIG. 11 is a detailed view 440 of an illustrative perforated platen 20 for a printing system 10, which is configured to induce high air flow levels 24 through platen apertures 110 in non-printing regions 408*n*, and low air flow levels 24 through platen apertures 110 in printing regions 408*p*, wherein the platen apertures 110 can be configured in longitudinal rows 442 to generally align with belt apertures 108 defined through a perforated transfer belt 18. As seen in FIG. 10, any of the location, spacing, i.e., density, and the size, i.e., diameter of the platen apertures 110 can be configured to establish different regions 408 to apply different amounts of vacuum 24.

Figure 12:
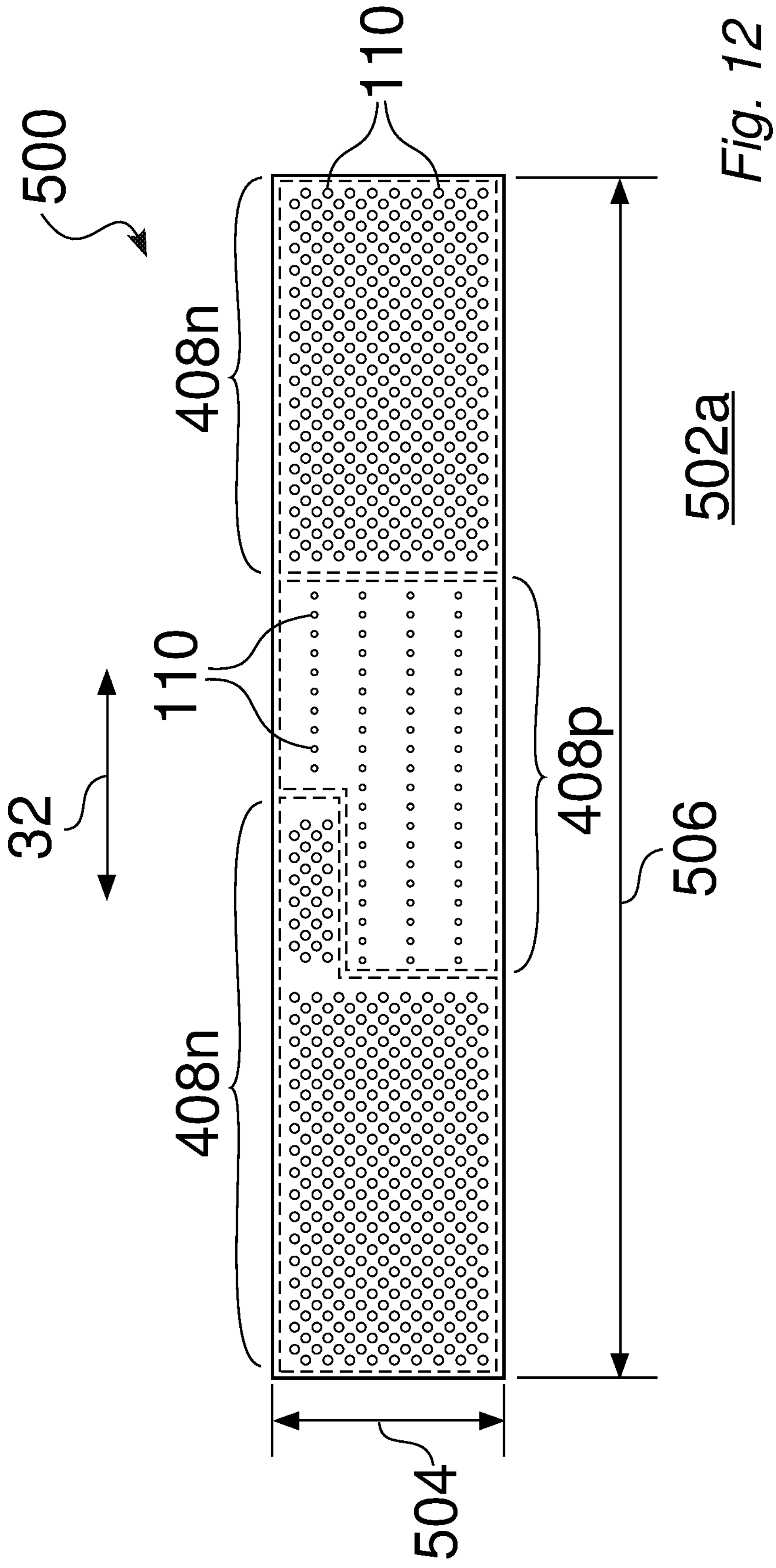
FIG. 12 is a plan view of an illustrative modular platen plate that is configured to induce high air flow levels in non-printing regions, and low air flow levels in printing regions.
Figure 13:
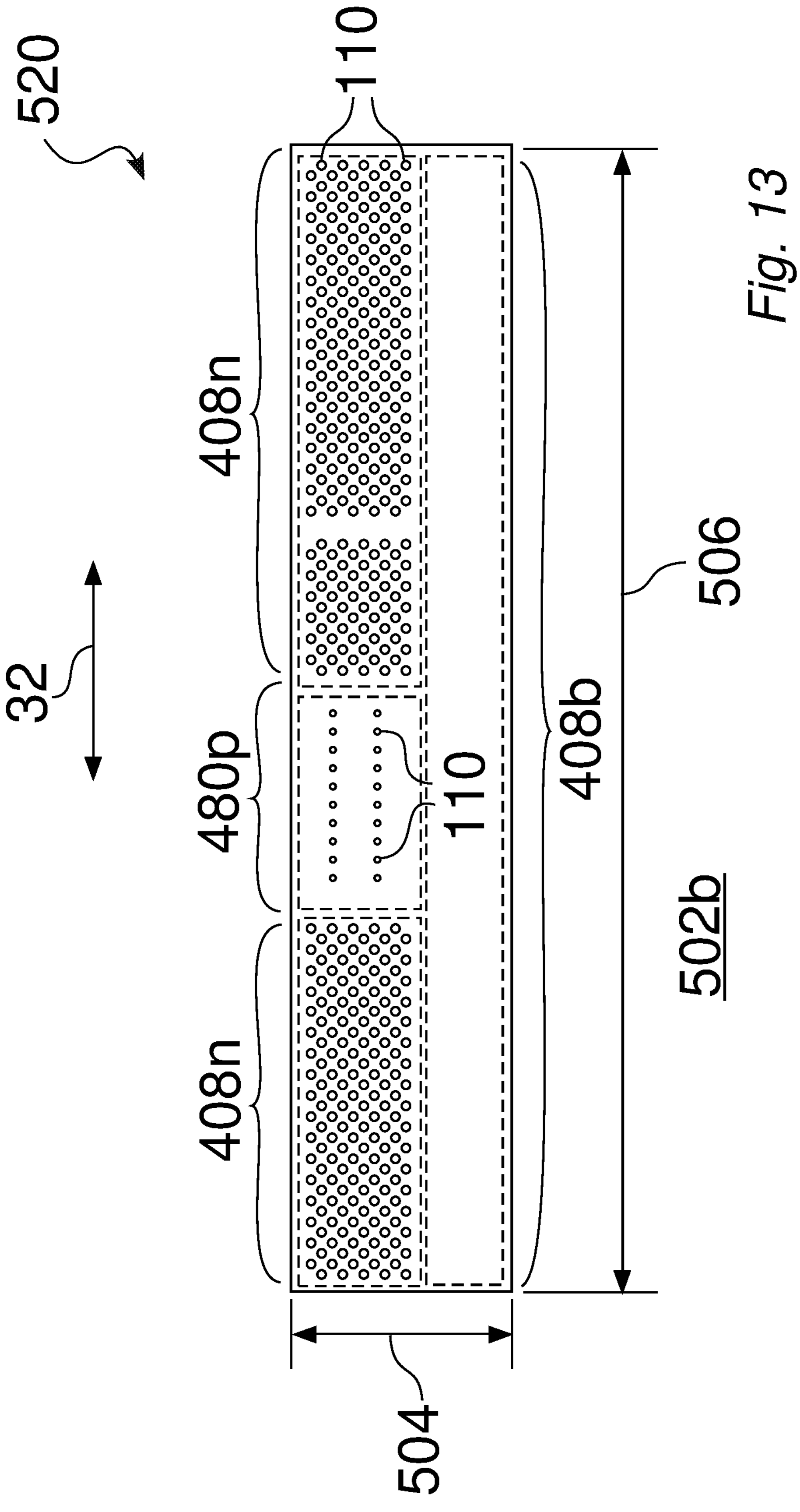
FIG. 13 is a plan view of an alternate illustrative modular platen plate that is configured to induce high air flow levels in non-printing regions, and low air flow levels of vacuum in printing regions.
Figure 14:
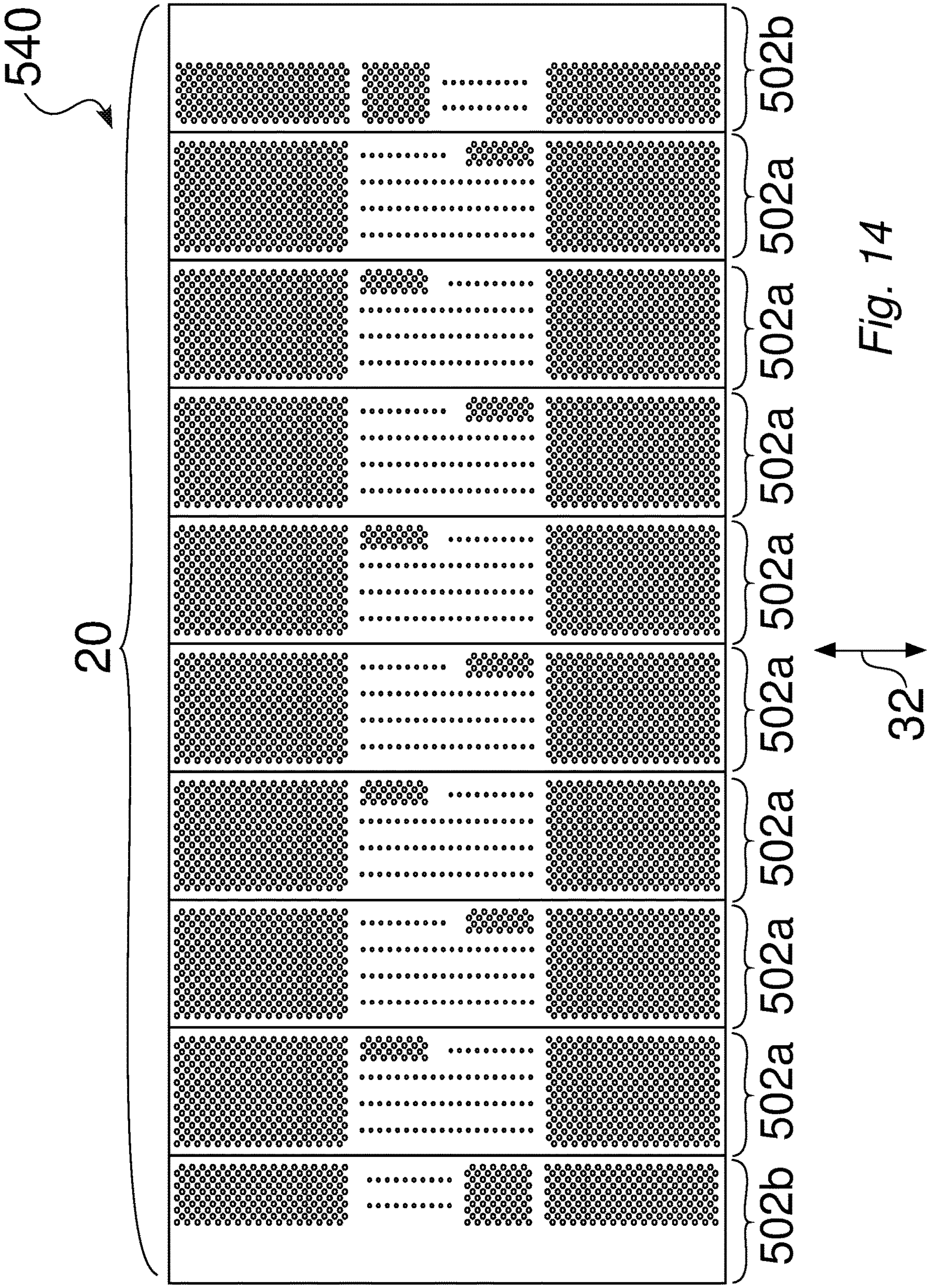
FIG. 14 is a plan view of an illustrative platen assembly that includes a plurality of modular platen plates.

While some embodiments of the perforated platen 20 can be provided a single perforated sheet, e.g., a single stainless steel or aluminum alloy, other embodiments can be configured using multiple plates 502, such as seen in FIGS. 12-14.

FIG. 12 is a plan view 500 of an illustrative modular platen plate 502, e.g., 502*a*, that is configured to induce high air flow levels 24 in non-printing regions 408*n*, and low air flow levels 24 in printing regions 408*p*. FIG. 13 is a plan view 520 of an alternate illustrative platen plate 502, e.g., 502*b*, that is configured to apply high levels of vacuum in non-printing regions 408*n*, and low levels of vacuum 24 in printing regions 408*p*. As seen in FIGS. 12 and 13, the platen plates 502 have a length 506, such as generally corresponding to the width 410 (FIG. 10) of an assembled perforated platen 20. As also seen in FIGS. 12 and 13, the platen plates 502 have a transverse width 504, such that a number of platen plates 502 can be installed, e.g., end-to end, to form the perforated platen 20. The illustrative platen plate 502*b* seen in FIG. 13 also includes a non-perforated region 408*b*, wherein the plate 502*b* can be used in transition regions, e.g., an entry region 146 and/or an exit region 148.

Figure 15:
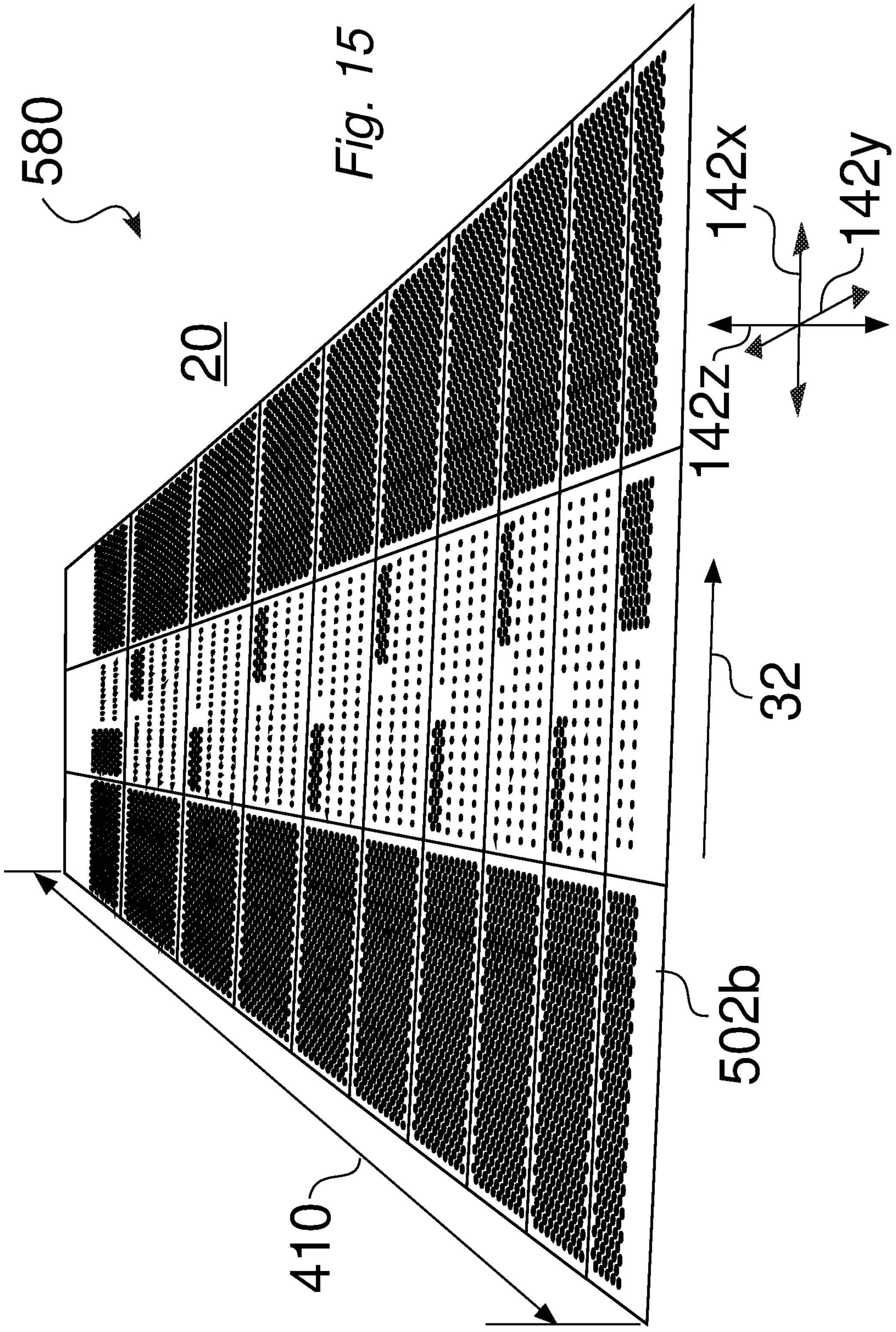
FIG. 15 is a detailed feed entrance of an illustrative embodiment of a platen assembly that includes a plurality of modular platen plates.

FIG. 14 is a plan view 540 of an illustrative platen assembly 20 that includes a plurality of modular platen plates 502, e.g., 502*a* and 502*b*, which can be configured to define a perforated platen 20 that includes any of printing regions 408*p*, non-printing regions 408*n*, and/or transition regions 408*b* (FIG. 11). FIG. 15 is a detailed partial lateral view 580 of an illustrative platen assembly 20 having a characteristic width 410, that includes a plurality of modular platen plates 502. While the illustrative platen plates 502 can be configured as a series of plates 502 that are longitudinally arranged to make up the perforated platen plate 20, other embodiments can include modular plates that can be transversely arranged across the width 410 of the platen 20.

Although in the previously presented embodiments, such as shown in FIG. 12, the transition between the printing regions 408*p* and the non-printing regions 408*n* is shown as perpendicular to the direction of travel 32, a transition between these two regions that is not perpendicular to the direction of travel is also considered as a method to mitigate the perturbation between these two regions 408*p*, 408*n*.

The use of the improved perforated platens 20, as disclosed herein, can readily be implemented to reduce or eliminate ink drop deflection effects 112*d* (FIG. 3) for a wide variety of vacuum conveyor configurations. As noted above, the phenomenon of drop deflection 112*d* is commonly observed in industrial inkjet printers with vacuum conveyor systems.

To mitigate drop deflection effects 112*d* effect on any of the leading edges 67*a* or trailing edges 67*b* of the workpieces WP, e.g., boards, some embodiments of the printing system 10 and associated structures and methods combine a passive system, such as the perforated platen 10 that reduces the air flow 24 in the region below the printheads 45, and an active system, such as a feed system 402 that distributes the workpieces WP in an optimal way with respect to the transfer belt perforations 108.

The introduction of the perforated platen 20, despite eliminating the drop deflection issue while keeping the workpiece WP flat, can impact the higher blower pressure necessary to generate enough force 24 in the high air flow regions 408*n* to compensate for the reduced force 24 in the low air flow regions 408*p*. In some circumstances, this can result in more severe working conditions of the conveyor system 11 that can be detrimental for the accurate and robust operation of the inkjet printing system 10.

Figure 16:
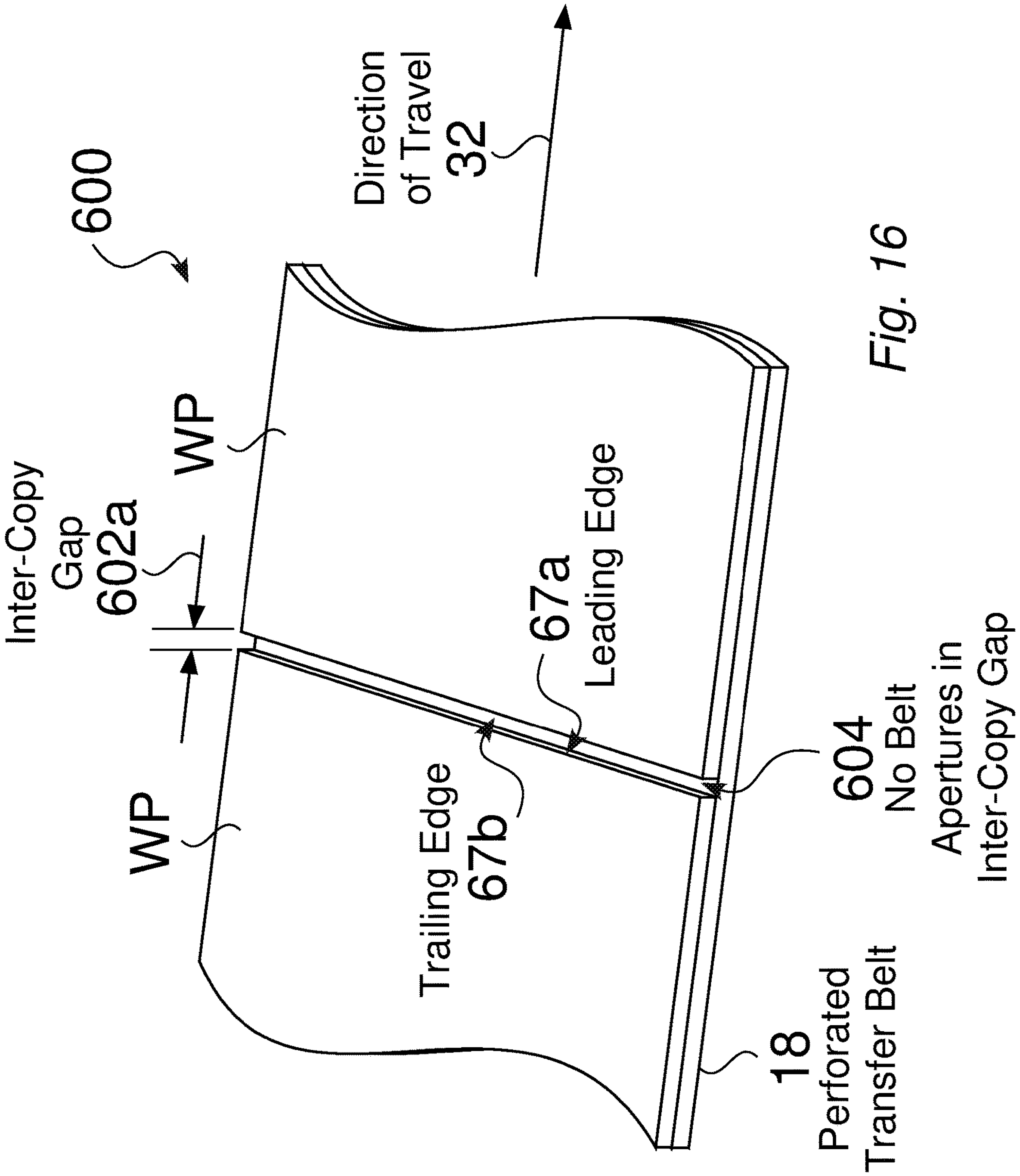
FIG. 16 is a schematic view of sequential feeding of substrates on a perforated transfer belt, in which no belt apertures are located within the inter gap region between sequentially transferred workpieces.
Figure 18:
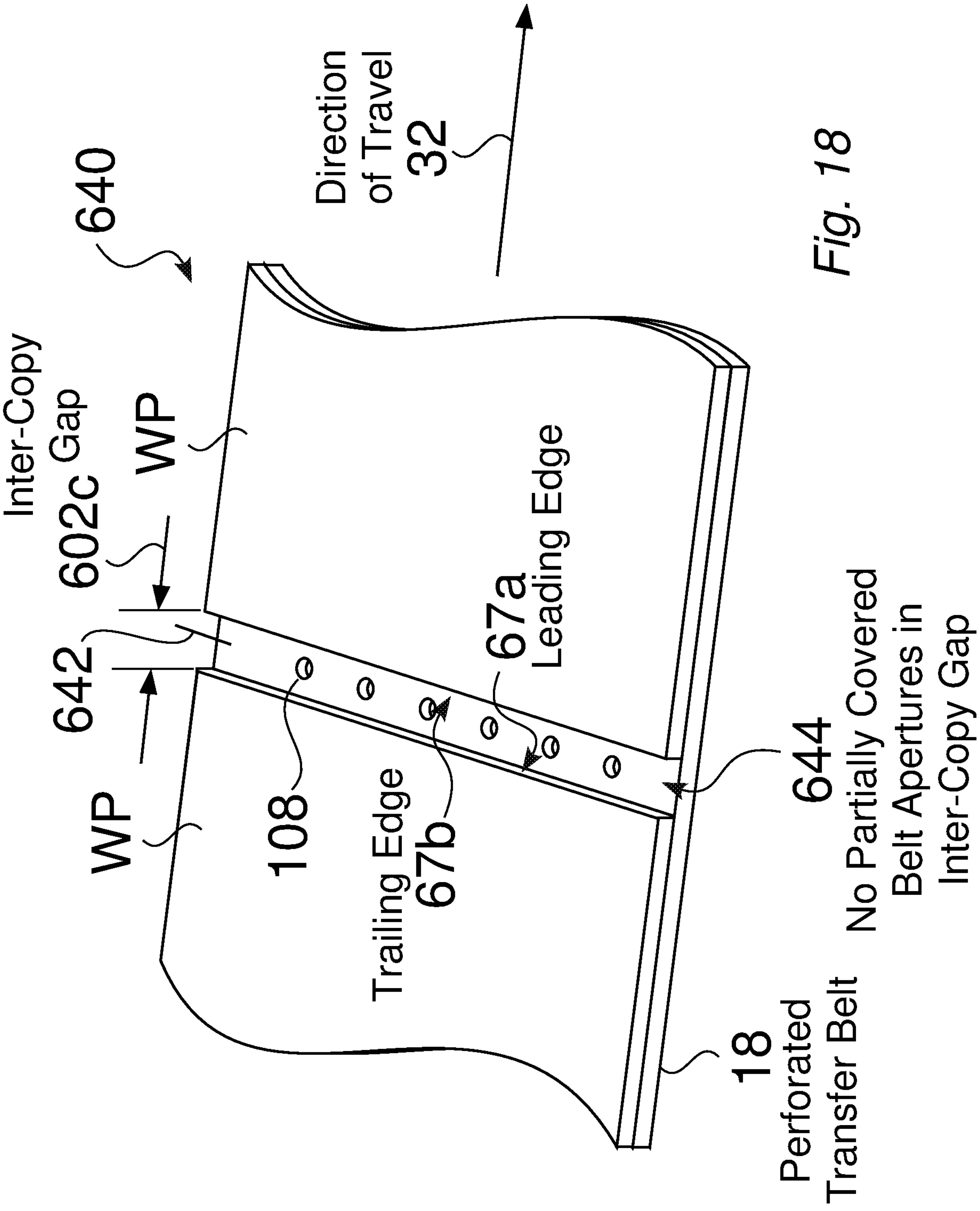
FIG. 18 is a schematic view of sequential feeding of substrates on a perforated transfer belt, in which no belt apertures are partially covered the workpieces in the inter gap region between sequentially transferred workpieces.

FIG. 16 is a schematic view 600 of sequential feeding of workpiece substrates WP on a perforated transfer belt 18, in which no belt apertures 108 are located within the inter-copy gap region 602*a* between sequentially transferred workpieces WP, as designated by 604. FIG. 17 is a schematic view 620 of sequential feeding of workpiece substrates WP on a perforated transfer belt 18, in which some of the belt apertures 108 are partially covered by at least one of the workpieces WP in the inter gap region 602*b* between sequentially transferred workpieces, as designated by 624. FIG. 18 is a schematic view 640 of sequential feeding of workpiece substrates WP on a perforated transfer belt 18, in which no belt apertures 108 are partially covered the workpieces WP in the inter-copy gap region 602*c* between sequentially transferred workpieces WP, as designated by 644.

The excess flow requirements through the perforated platen 20 and the perforated transfer belt 18 can this be reduced or eliminated, by ensuring that there are not belt holes 108 partially covered by the workpiece substrates WP. In some embodiments, this is accomplished with a synchronized feeder 402, that feeds workpiece substrates WP to ensure that there are not belt holes 108 that are partially covered by the workpiece substrates WP. In this case, the flow rate requirements in the region 408*p* below the printheads 45 are eliminated, because the belt holes 108 can be fully sealed by the substrate WP, so the holding force generated by these perforations 108 is independent of the flow through them. Contrary to the illustrative configuration seen in FIG. 17, this approach, such as seen in FIG. 18, does not ensure that there are not open holes 108 in the inter-copy gap 602*c* between substrates WP for certain combinations of gap between substrates WP, substrate length 64 and distance between belt holes 108 along the travel direction 32, but ensures that there are not partially covered belt holes 108. This approach can be achieved for any combination of substrate WP and process parameters. The difference between the different strategies is schematically shown in FIGS. 16-18.

The combination of the passive and active embodiments allows the printing system 10 to achieve a universal drop-deflection compensation solution. While the passive features, i.e., the perforated platen 20, can reduce the air flow 24 through the belt holes 108 that can be present in the gap 602 between substrates WP, active techniques, e.g., 710 (FIG. 19) can minimize the impact of the perforated platen 20 on the requirements on the vacuum system components 25.

Figure 19:
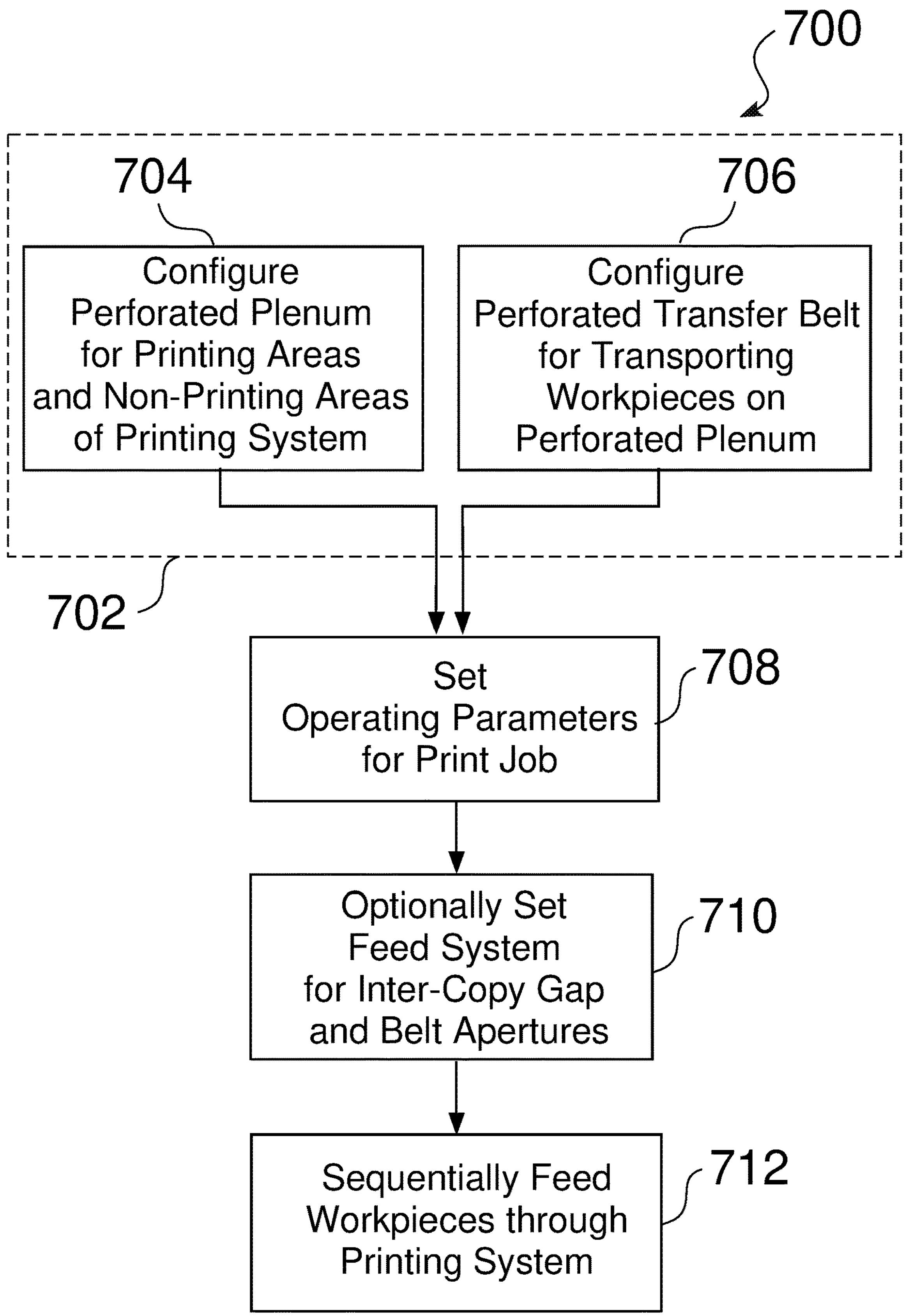
FIG. 19 is a flow chart for an illustrative method of configuring and operating a printing system that is configured to mitigate ink drop deflection, such as with passive as well as active drop deflection compensation.

FIG. 19 is a flow chart for an illustrative method 700 of configuring and operating a printing system 10 that is configured to mitigate ink drop deflection 112*d*, such as with passive as well as active drop deflection compensation. For instance, during setup 702 of the printing system 10, a perforated platen 20 is configured to apply different levels of vacuum 24 for printing areas 408*p* and non-printing areas 408*n*, and a perforated transfer belt 18 is provided for transporting workpieces WP on the perforated platen 20, through a printing region 406 having one or more printheads 45. In operation, specific operating parameters are set 708 for a specific print job 126 (FIG. 4), such as based on any of printing parameters, substrate alignment, vacuum zone shut off, substrate type, or substrate planarity. In some embodiments, the feed system 402 can be set for any of inter-copy gap 602 and belt apertures 108 located within the inter-copy gap 602. Once the operating parameters are set, the print job can be run, by sequentially feeding the workpieces WP through the active printing system 10.

An illustrative method 700 for mitigating ink drop deflection 112*d* in a printing system 10 can include configuring 704 a perforated platen 20 to apply a lower induced air flow level of vacuum 24 in a printing region 408*p* proximate to a printhead 45 than the induced air flow level of vacuum 24 to a region 408*n* other than the printing region 408*p*; configuring 706 a perforated transfer belt 18 for transporting workpieces WP over the perforated platen 20; setting operating parameters 708 for a print job; sequentially feeding 712 the workpieces WP onto the transfer belt 18 while applying vacuum 24 through the perforated platen 20 and the perforated transfer belt 18 to constrain the workpieces WP; and jetting ink 102 onto the workpieces WP based on the print job; wherein the printing system 10 mitigates ink drop deflection 112*d*. In some embodiments, wherein the perforated transfer belt 18 includes a plurality or belt apertures 108 extending therethrough, the workpieces WP are sequentially fed 112 onto the transfer belt 18 such that there are no belt apertures 108 that are partially covered by the workpieces WP.

The disclosed printing systems, structures and methods can be implemented for a wide variety of inkjet industrial printers, and makes possible the flattening, conveying and printing of highly deformed and stiff substrates WP, without significant degradation of the printing quality.

The description herein provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein. Additionally, some well-known structures or functions may not be shown or described in detail herein, to avoid unnecessarily obscuring the relevant descriptions of the various illustrative examples.

The terminology used herein is to be interpreted in its broadest reasonable manner, even though it is being used in conjunction with a detailed description of certain specific examples of the embodiments. Indeed, certain terms may even be emphasized herein. However, any terminology intended to be interpreted in any restricted manner will be overtly and specifically defined as such.

Figure 20:
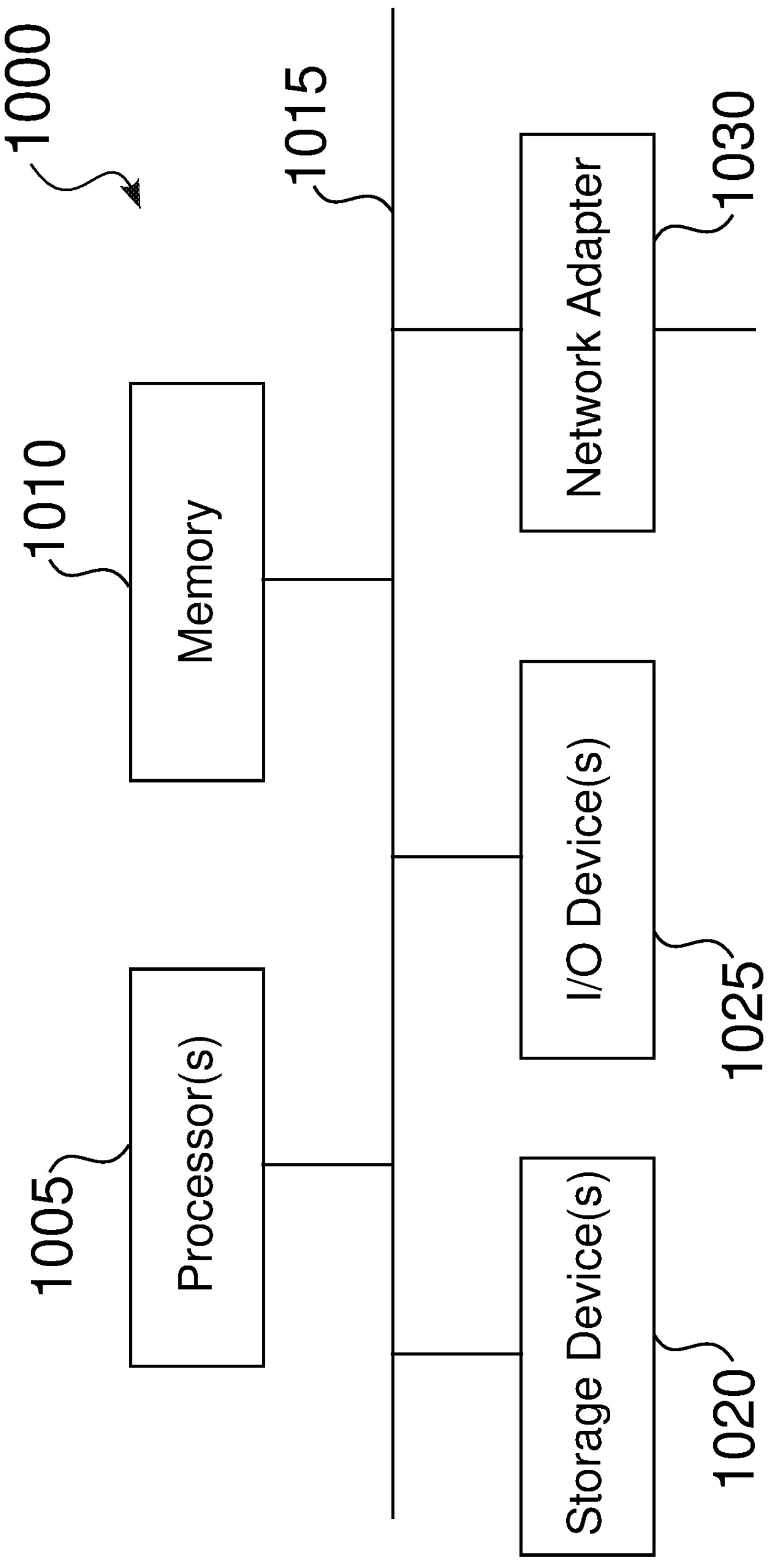
FIG. 20 is a high-level block diagram showing an example of a processing device that can represent any of the systems described herein.

FIG. 20 is a high-level block diagram showing an example of a processing device 1000 that can be a part of any of the systems described above, such as the print system controller 21, or local controllers 23,302. Any of these systems may be or include two or more processing devices such as represented in FIG. 20, which may be coupled to each other via a network or multiple networks. In some embodiments, the illustrative processing device 1000 seen in FIG. 20 can be embodied as a machine in the example form of a computer system within which a set of instructions for causing the machine to perform one or more of the methodologies discussed herein may be executed.

In the illustrated embodiment, the processing system 1000 includes one or more processors 1005, memory 1010, a communication device and/or network adapter 630, and one or more storage devices 1020 and/or input/output (I/O) devices 1025, all coupled to each other through an interconnect 1015. The interconnect 1015 may be or include one or more conductive traces, buses, point-to-point connections, controllers, adapters and/or other conventional connection devices. The processor(s) 1005 may be or include, for example, one or more general-purpose programmable microprocessors, microcontrollers, application specific integrated circuits (ASICs), programmable gate arrays, or the like, or a combination of such devices. The processor(s) 1005 control the overall operation of the processing device 1000. Memory 1010 and/or 1020 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1010 and/or 1020 may store data and instructions that configure the processor(s) 1005 to execute operations in accordance with the techniques described above. The communication device 1030 may be or include, for example, an Ethernet adapter, cable modem, Wi-Fi adapter, cellular transceiver, Bluetooth transceiver, or the like, or a combination thereof. Depending on the specific nature and purpose of the processing device 1000, the I/O devices 1025 can include devices such as a display (which may be a touch screen display), audio speaker, keyboard, mouse or other pointing device, microphone, camera, etc.

While the printing system 10 can readily be implemented for a wide variety of inkjet industrial printers 10, it should readily be understood that the vacuum conveyor system 11 also be configured for other ink and fluid delivery systems.

Unless contrary to physical possibility, it is envisioned that (i) the methods/steps described above may be performed in any sequence and/or in any combination, and that (ii) the components of respective embodiments may be combined in any manner.

Many of the ink delivery system and printer system techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, or any device with one or more processors, etc.). For example, a machine-accessible medium includes recordable/non-recordable media, e.g., read-only memory (ROM); random access memory (RAM); magnetic disk storage media; optical storage media; flash memory devices; etc.

Those skilled in the art will appreciate that actual data structures used to store this information may differ from the figures and/or tables shown, in that they, for example, may be organized in a different manner; may contain more or less information than shown; may be compressed, scrambled and/or encrypted; etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

We claim:

1. A platen for a printing system, the platen comprising:

a plate that has apertures defined therethrough, the plate being configured to support a transfer belt as the transfer belt is advanced through a printing region that spatially corresponds to a plurality of printheads;

wherein location, spacing, and/or size of the apertures located beneath the plurality of printheads is different than location, spacing, and/or size of the apertures located in one or more regions other than below the plurality of printheads, such that air flow induced by a vacuum is less beneath the plurality of printheads than in the one or more regions.

2. The platen of claim 1, wherein the plate has (i) a first surface that is adjacent to the transfer belt and (ii) a second surface that is parallel to, but opposite, the first surface, and wherein the apertures extend from the first surface to the second surface and are arranged in a plurality of rows that extend longitudinally between a first end and a second end opposite to the first end.

3. The platen of claim 1, wherein the transfer belt has apertures defined therethrough, and wherein the apertures through the transfer belt are substantially aligned with the apertures through the plate, such that vacuum originating from beneath the plate can be applied to a substrate to constrain the substrate on the transfer belt.

4. The platen of claim 1, wherein the apertures located beneath the plurality of printheads are representative of a first subset of the apertures, wherein the apertures located in the one or more regions other than beneath the plurality of printheads are representative of a second subset of the apertures, and wherein the plurality of printheads are positioned in a staggered arrangement, such that the apertures in the first subset are positioned in a staggered arrangement so that as a substrate moves through the printing region, the substrate alternately moves across apertures in the first subset and apertures in the second subset.

5. The platen of claim 1, wherein the plurality of printheads are positioned in a staggered arrangement, so that as a substrate moves through the printing region, the substrate alternates between a first level of vacuum and a second level of vacuum lower than the first level of vacuum.

6. A system for transferring a substrate through a printing region that spatially corresponds to a plurality of printheads, the system comprising:

a transfer belt that has a first set of apertures defined therethrough, the transfer belt being configured to advance through the printing region;

a platen that has a second set of apertures defined therethrough, the platen being configured to support the transfer belt; and a source configured to apply a vacuum through the first and second sets of apertures to constrain the substrate on the transfer belt;

wherein location, spacing, and/or size of the apertures in the second set varies longitudinally and latitudinally across the printing region, such that as the substrate moves through the printing region, the substrate alternates between different amounts of the vacuum.

7. The system of claim 6, wherein the different amounts of the vacuum correspond to different location, spacing, and/or size of the apertures in the second set.

8. The system of claim 6, wherein the second set of apertures includes (i) a first subset of apertures that are located beneath the plurality of printheads and (ii) a second subset of apertures that are located in regions other than beneath the plurality of printheads, and wherein less vacuum is applied through the first subset of apertures than the second subset of apertures.

9. The system of claim 8, further comprising:

a feed system that is configured to feed the substrate onto the transfer belt.

10. The system of claim 9, wherein the feed system is synchronized with the transfer belt, such that a leading edge of the substrate is fed onto one of the regions.

11. The system of claim 10, wherein the feed system is synchronized with the transfer belt, such that a trailing edge of the substrate is fed onto another of the regions.

12. The system of claim 9, wherein the feed system is configurable to maintain, between adjacent substrates, an inter-copy gap of predetermined size or a predetermined number of the apertures in the first set.

13. The system of claim 9, wherein the apertures in the first set are arranged in a plurality of rows that extend transversely across the transfer belt, and wherein the feed system is synchronized with the transfer belt to ensure that none of the apertures in the first set are partially covered by a leading edge or a trailing edge of the substrate.

14. The system of claim 8, wherein limits along a travel direction of an envelope of the second set of apertures that are configured to reduce flow induced by the vacuum are not perpendicular to the travel direction.

15. The system of claim 14, wherein a shape of the limits along the travel direction of the envelope of the second set of apertures is configured to reduce the flow induced by the vacuum to mitigate perturbation or deviation of a transition between regions beneath the plurality of printheads and the regions other than beneath the plurality of printheads.

16. A method for mitigating ink drop deflection by a printing system that includes a printhead, the method comprising:

configuring a platen that has a first set of apertures defined therethrough, so that vacuum supplied by a source is applied at a lower level in a first region that is beneath the printhead than in a second region that is not beneath the printhead; and configuring a transfer belt that has a second set of apertures defined therethrough, so that substrates are transportable over the platen in a given direction;

wherein as the substrates are transferred in the given direction by the transfer belt, varying amounts of the vacuum are applied to the substrates.

17. The method of claim 16, further comprising:

receiving input that is indicative of one or more operating parameters for a print job; and running the print job by (i) causing a feed system to feed a substrate onto the transfer belt, and (ii) causing the substrate to be transferred beneath the printhead as ink is jetted onto the substrate.

18. The method of claim 17, wherein the one or more operating parameters are indicative of printing parameters, alignment of the substrate, vacuum zone shut off, type of the substrate, or planarity of the substrate.

19. The method of claim 17, wherein the substrate is one of multiple substrates that are fed onto the transfer belt as part of the print job, and wherein the feed system is synchronized with the transfer belt such that no apertures in the second set are partially covered by the multiple substrates.

20. The method of claim 17, wherein the first set of apertures includes (i) a first subset of apertures that are located beneath the printhead and (ii) a second subset of apertures that are located in regions other than beneath the printhead, wherein less vacuum is applied through the first subset of apertures than the second subset of apertures, and wherein the substrate is fed onto the transfer belt such that when the ink is jetted onto the substrate, each aperture in the first subset is covered by the substrate.

* * * * *